US011936144B2

United States Patent
Cheung et al.

(10) Patent No.: US 11,936,144 B2
(45) Date of Patent: *Mar. 19, 2024

(54) ROTATABLE DOCKING STATION WITH CABLE HOLD AND RELEASE MECHANISM

(71) Applicant: Crestron Electronics, Inc., Rockleigh, NJ (US)

(72) Inventors: King Woo Cheung, New City, NY (US); Ningsheng Zhu, Whippany, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,475

(22) Filed: May 1, 2023

(65) Prior Publication Data

US 2023/0268698 A1 Aug. 24, 2023

Related U.S. Application Data

(63) Continuation of application No. 17/578,623, filed on Jan. 19, 2022, now Pat. No. 11,682,869.

(51) Int. Cl.
*H01R 13/00* (2006.01)
*H01R 13/60* (2006.01)
(Continued)

(52) U.S. Cl.
CPC ............ *H01R 13/72* (2013.01); *H01R 13/60* (2013.01); *H01R 33/97* (2013.01); *H02G 11/02* (2013.01); *H01R 2201/06* (2013.01)

(58) Field of Classification Search
CPC ........ H01R 13/72; H01R 13/60; H01R 33/97; H01R 2201/06; H02G 11/02
See application file for complete search history.

(56) References Cited

U.S. PATENT DOCUMENTS 2,171,338 A * 8/1939 Henderson ............ E04B 1/0023
52/480
5,377,598 A 1/1995 Kirchner et al.
(Continued)

FOREIGN PATENT DOCUMENTS

EP 2171338 A1 4/2010
JP 2006208834 8/2006
(Continued)

*Primary Examiner* — Phuong Chi Thi Nguyen
(74) *Attorney, Agent, or Firm* — Crestron Electronics, Inc.

(57) ABSTRACT

A swivel mount assembly for rotational mounting of an electronic device to a mounting structure includes a rotatable body inserted, in part, into an opening in the mounting structure and rotatable about an axis extending through the mounting structure opening. A plate part above the mounting structure has an opening that opens into the mounting structure opening. A sidewall is joined at one end to the plate part and has a side aperture formed therein. A roller is disposed in the opening in the plate part and directs a cable extending through the opening in the mounting structure to further pass through the side aperture. A hold/release mechanism, disposed above the plate part, holds the cable and prevents its movement when the hold/release mechanism is in a first setting, and releases the cable and permits its movement when the hold/release mechanism is in a second setting.

19 Claims, 16 Drawing Sheets

(51) Int. Cl.
*H01R 13/72* (2006.01)
*H01R 33/97* (2006.01)
*H02G 11/02* (2006.01)

(56) References Cited

U.S. PATENT DOCUMENTS

| | | | |
|---|---|---|---|
| 6,231,020 B1 | 5/2001 | Willson | |
| 6,256,193 B1 * | 7/2001 | Janik | G06F 1/1669 248/922 |
| 7,481,170 B2 | 1/2009 | Sommerfield | |
| 7,677,517 B2 * | 3/2010 | Suzuki | F16M 11/08 248/922 |
| 7,801,070 B2 * | 9/2010 | Omae | H04W 8/065 455/7 |
| 8,302,221 B1 * | 11/2012 | Camp, Jr. | A61G 5/125 5/81.1 RP |
| 8,469,303 B2 | 6/2013 | Feldstein | |
| 8,469,304 B2 | 6/2013 | Feldstein | |
| 8,469,305 B2 | 6/2013 | Feldstein | |
| 8,657,224 B2 | 2/2014 | Feldstein | |
| 8,698,617 B2 | 4/2014 | Henson | |
| 8,740,127 B2 | 6/2014 | Soper et al. | |
| 9,056,744 B2 | 6/2015 | Feldstein | |
| 9,475,673 B2 | 10/2016 | Feldstein | |
| 9,599,276 B2 | 3/2017 | Grziwok | |
| 9,936,823 B2 | 4/2018 | Galant | |
| 10,549,946 B2 | 2/2020 | Pedoeem et al. | |
| 10,677,386 B2 | 6/2020 | Hoang | |
| 10,766,736 B2 | 9/2020 | Replogle et al. | |
| 10,772,223 B2 | 9/2020 | Pedoeem et al. | |
| 10,858,865 B2 | 12/2020 | Kelsch et al. | |
| 10,920,922 B2 | 2/2021 | Chapuis et al. | |
| 11,211,462 B2 | 12/2021 | Park et al. | |
| 11,268,650 B2 | 3/2022 | Kim | |
| 11,448,356 B2 | 9/2022 | Horvath | |
| 2009/0255588 A1 | 10/2009 | Bors | |
| 2009/0256048 A1 | 10/2009 | Fujikawa et al. | |
| 2009/0321186 A1 | 12/2009 | Louchart | |
| 2012/0037783 A1 | 2/2012 | Alexander | |
| 2012/0193486 A1 | 8/2012 | Levin | |
| 2013/0043369 A1 | 2/2013 | Wheeler | |
| 2014/0048667 A1 | 2/2014 | Ziesen | |
| 2015/0327693 A1 | 11/2015 | Ballhatchet | |

FOREIGN PATENT DOCUMENTS

| | | |
|---|---|---|
| JP | 5778871 | 9/2015 |
| KR | 101957480 | 3/2019 |
| TW | 201517765 | 5/2015 |

* cited by examiner

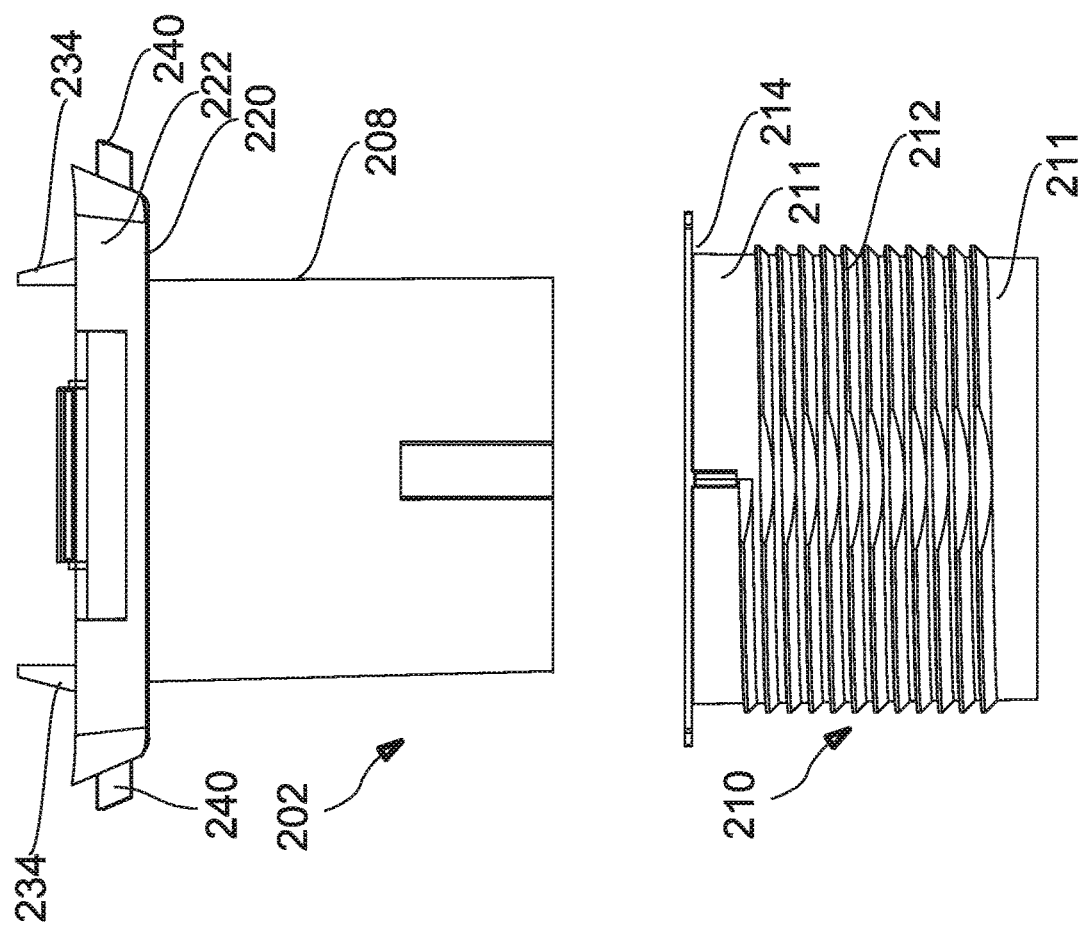
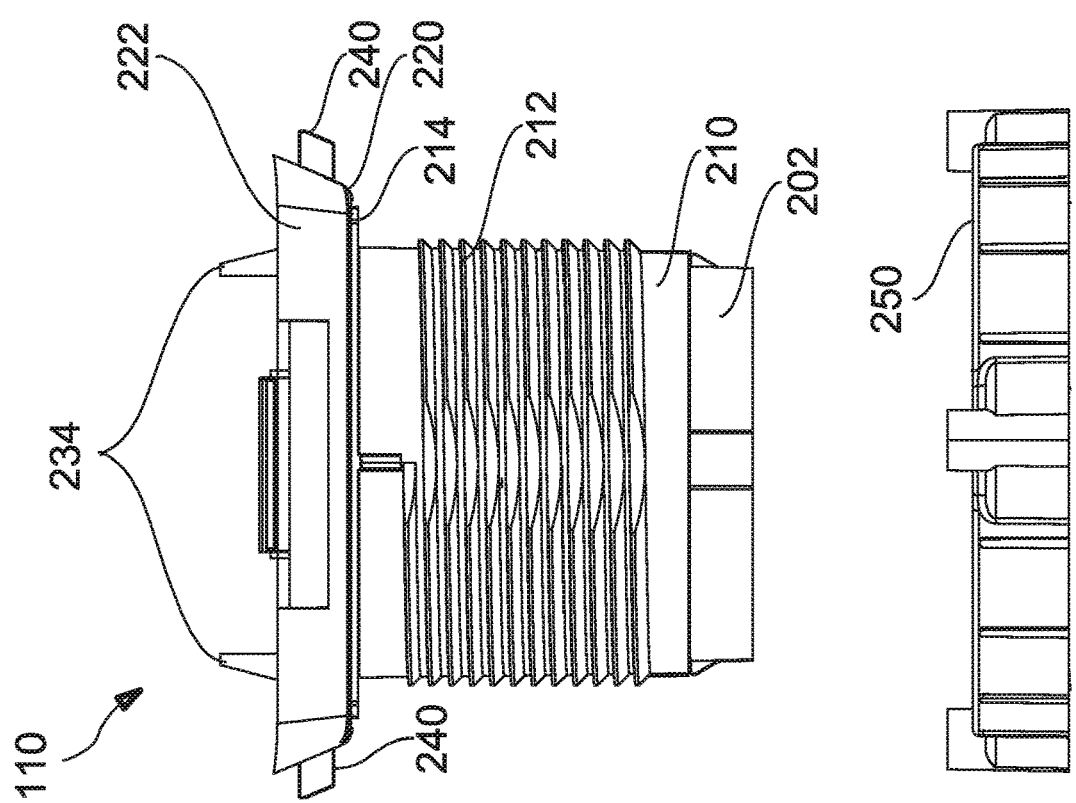
FIG. 2B
FIG. 2A

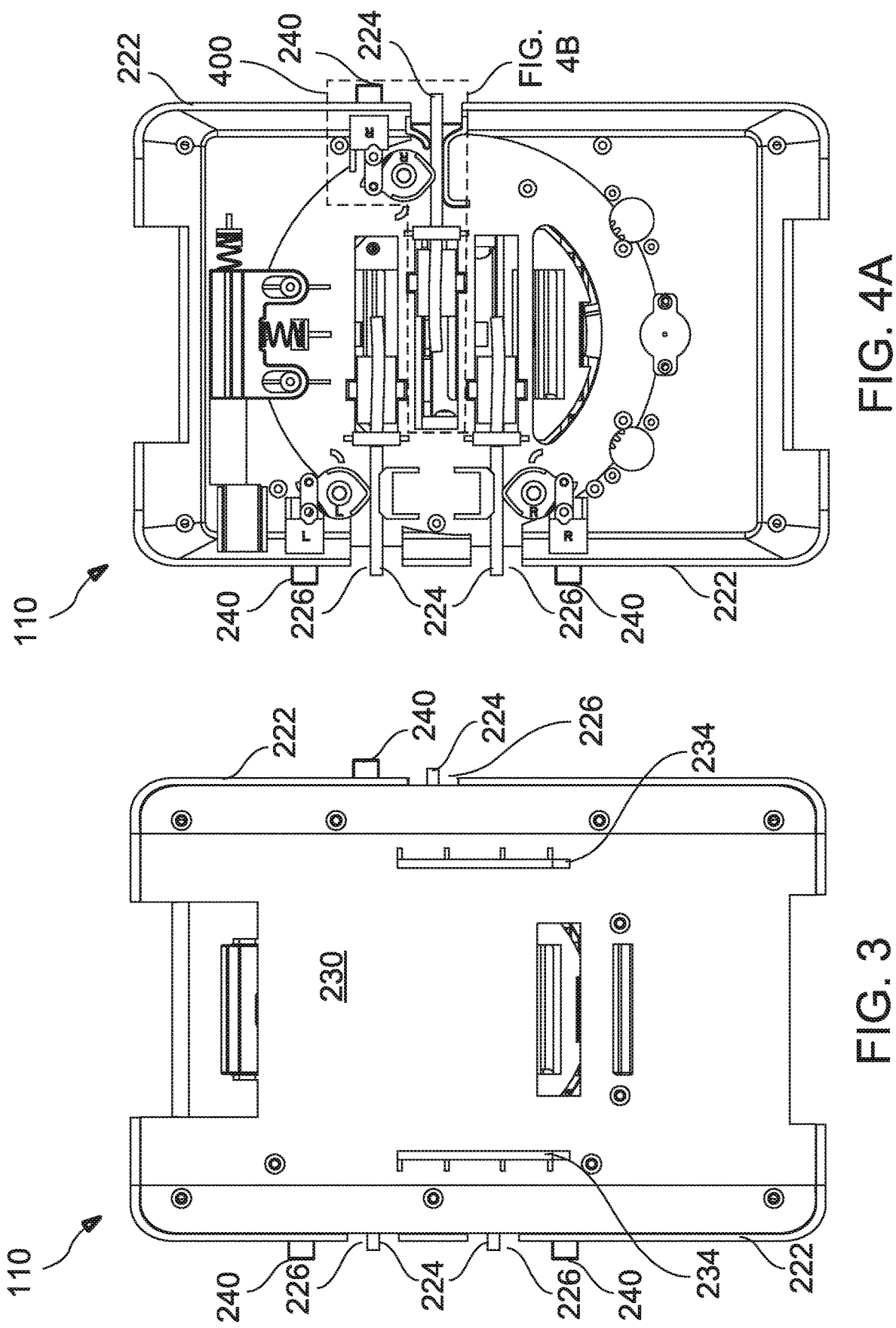

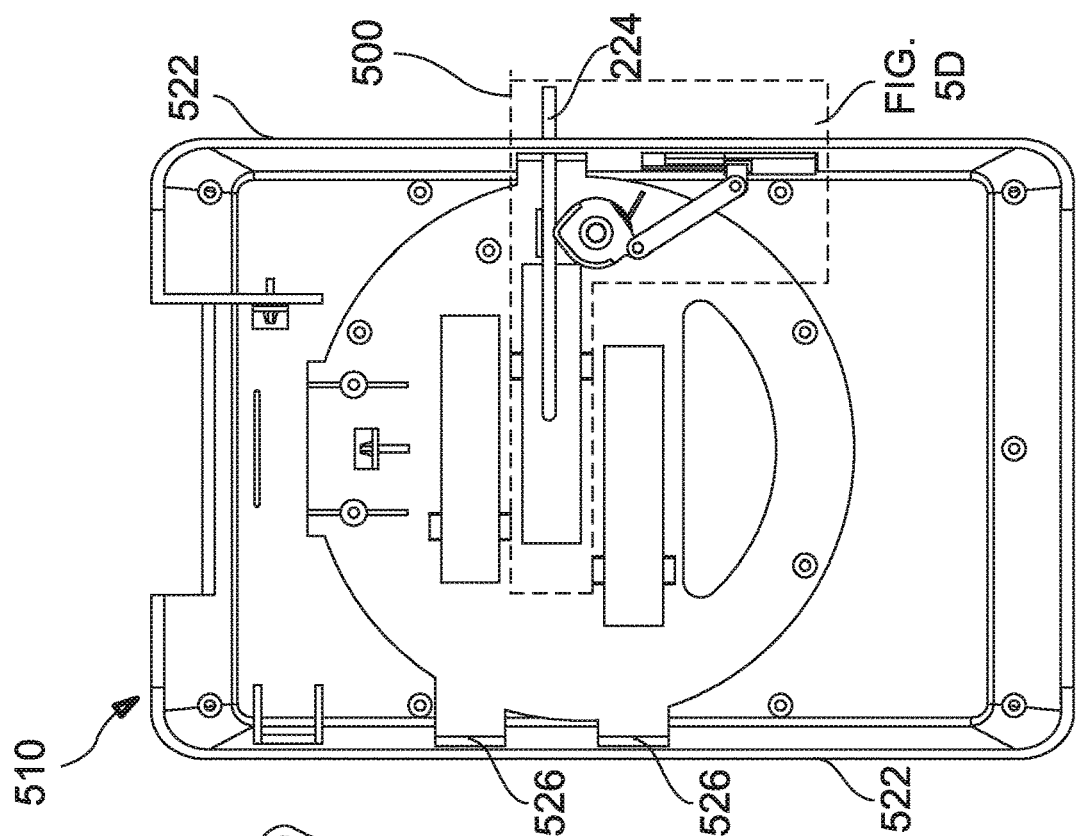
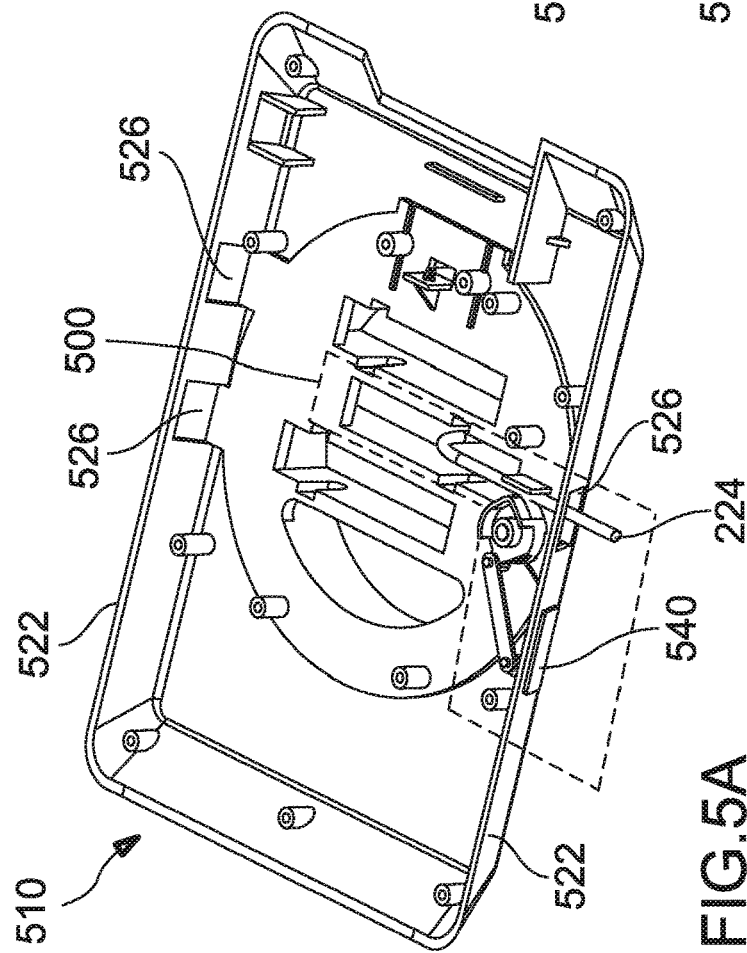
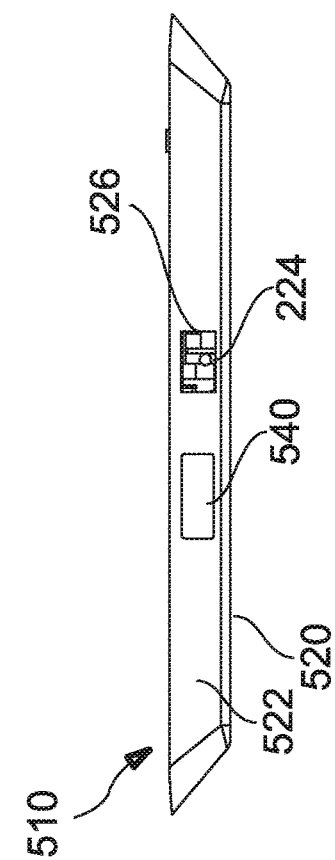
FIG. 5B
FIG. 5A
FIG. 5C

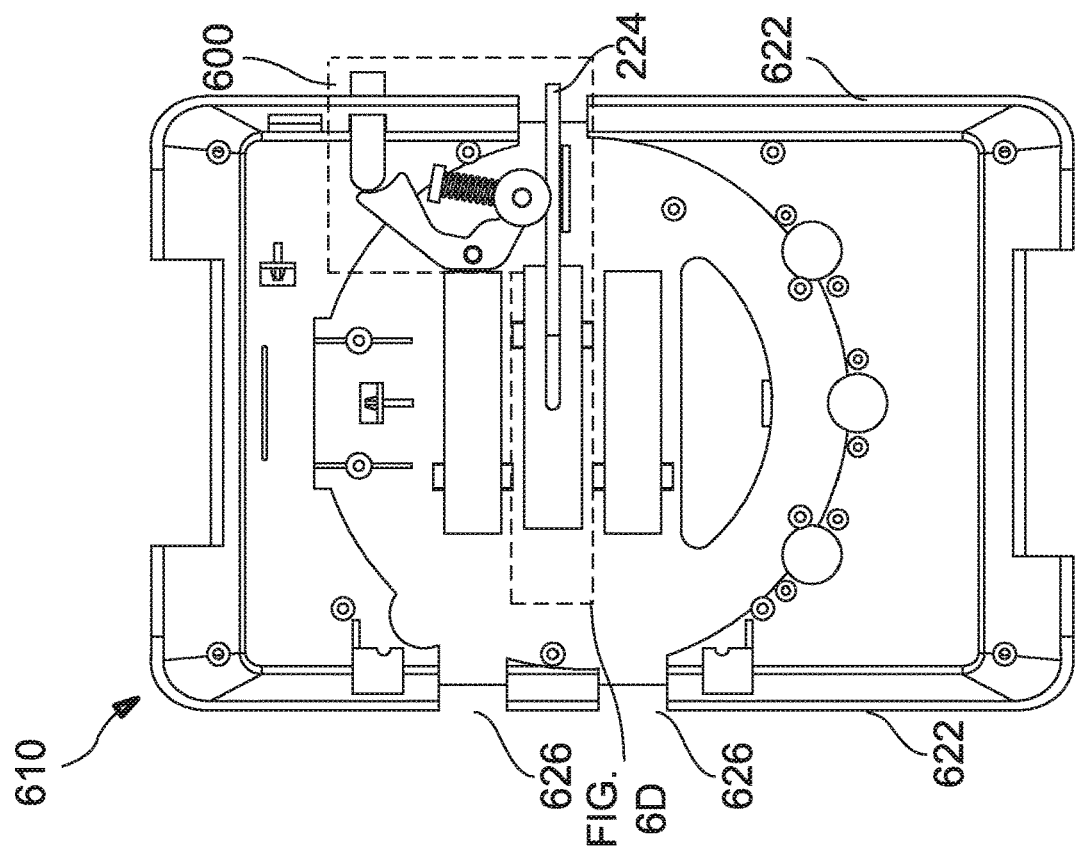
FIG. 6B
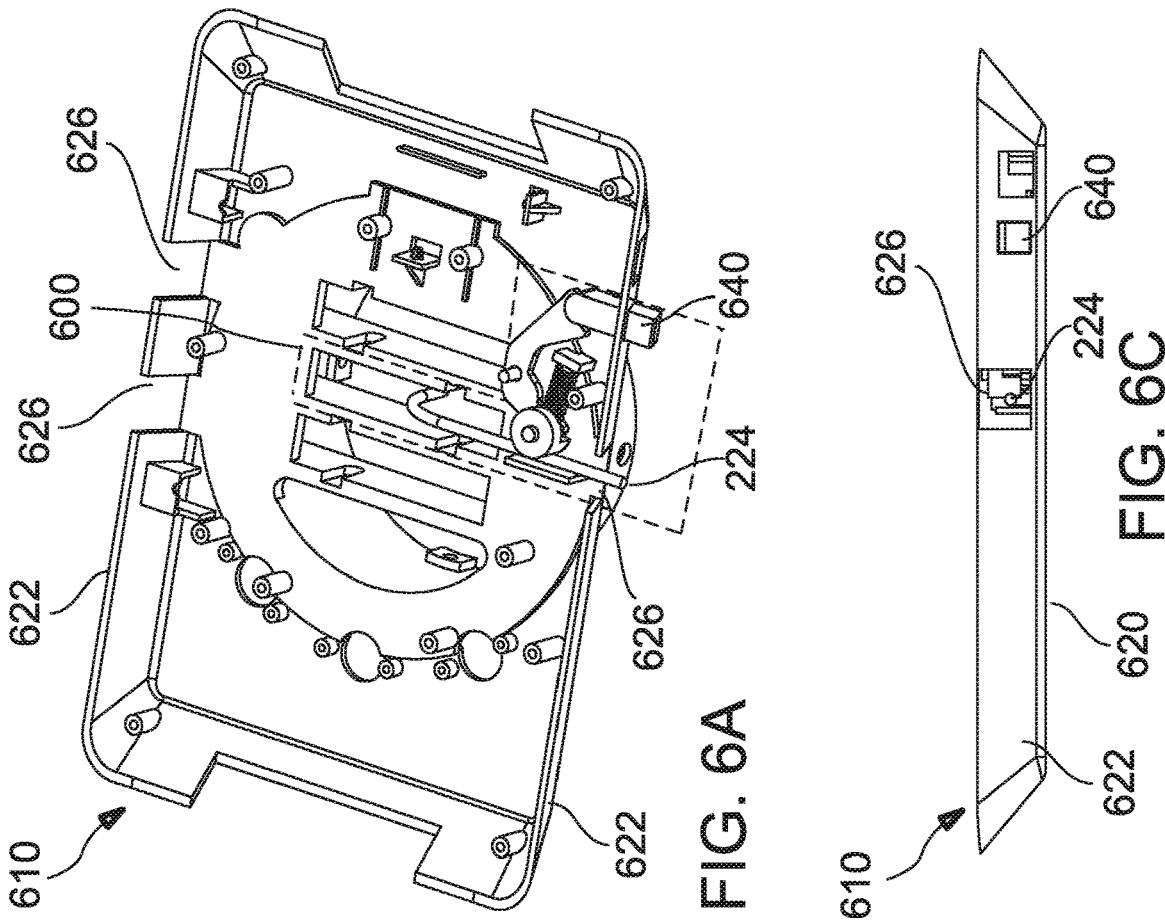
FIG. 6A
FIG. 6C

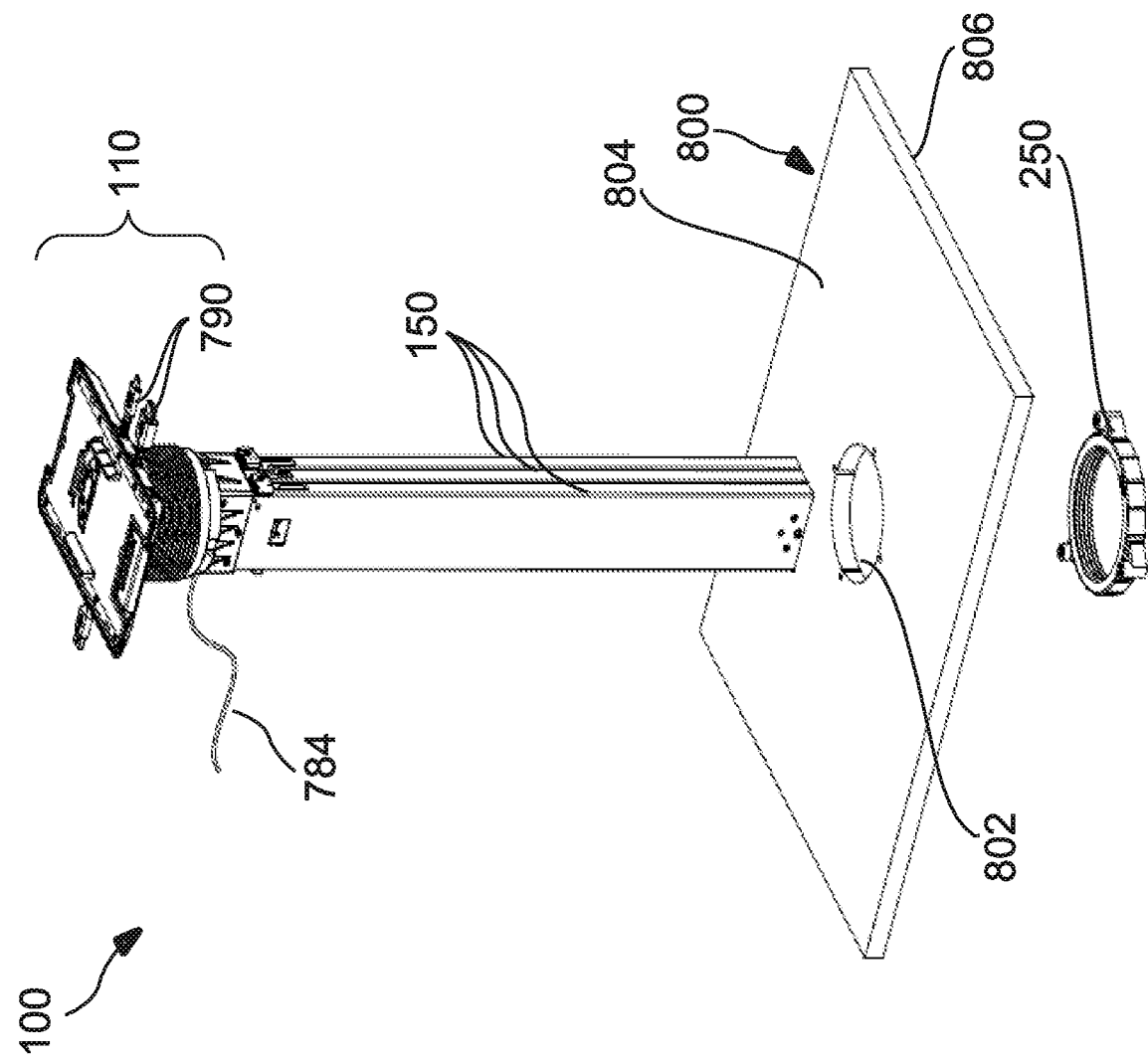

ROTATABLE DOCKING STATION WITH CABLE HOLD AND RELEASE MECHANISM

CROSS-REFERENCE TO RELATED APPLICATIONS

This application is a continuation of U.S. application Ser. No. 17/578,623, filed Jan. 19, 2022, the disclosure of which is incorporated herein by reference.

BACKGROUND OF THE INVENTION

Technical Field

The present embodiments relate to devices for rotatably mounting electronic devices atop a surface, such as a desk top or table top, and for storing, withdrawing, and retracting cables for providing power and data connections used in conjunction with devices for rotatably mounting electronic devices.

Background Art

In many applications, it is desirable to provide electronic devices that permit the control of audio, video, conferencing, and other functions by plural people within a common area, such as in a conference room. To enable each person to access the electronic device, the electronic device may be disposed atop a surface that is available to each of these participants, such as atop a table top of desk top. To use the electronic device, a person in the conference room or other common area preferably faces, for example, a screen and/or keypad of the electronic device. When another person in the room desires access to the device, the prior user may need to switch seats or spots with the new user, which may be disruptive to the flow of a conference or meeting. Alternatively, the electronic device may be physically moved along the table top from the location of one user to that of another user, which is also disruptive and may inadvertently cause one or more of the cables connected to the electronic device to be disconnected.

It is therefore desirable to provide a docking station or mounting assembly that supports such electronic devices in a manner that permits the electronic device surface to be turned from one user to another while minimizing disruption and minimizing the risk of the disconnection of cables.

In many such applications, it is further desirable for the docking station or mounting assembly to provide additional power and data connections to different electrical or electronic devices in the conference room or other common area using cables which may be dispensed when needed and then withdrawn out of sight when no longer needed.

It is therefore desirable to provide cable retractors that are suitable for attachment to, and for use in conjunction with, such a mounting or docking station.

SUMMARY OF THE INVENTION

It is to be understood that both the general and detailed descriptions that follow are exemplary and explanatory only and are not restrictive.

DISCLOSURE OF INVENTION

In accordance with an aspect, a swivel mount assembly for rotational mounting of an electronic device to a mounting structure comprises: (a) an assembly body, comprising: (1) an insertable part configured to be inserted into an opening in the mounting structure, the opening extending from a first surface of the mounting structure to an opposing second surface of the mounting structure, the insertable part having a shape that conforms to a shape of the opening, (2) a lip part attached to an end of the insertable part and being wider than the opening in the mounting structure such that, upon the insertable part being inserted into the opening, the lip part rests on the first surface; (b) a securing body configured to secure the assembly body to the mounting structure; and (c) a rotatable body configured to be rotatable about an axis extending through the opening in the mounting structure, the rotatable body comprising: (1) another insertable part configured to be inserted into an opening in the insertable part of the assembly body, the another insertable part having an opening that extends from one end of the another insertable part to an opposing end of the another insertable part, (2) a plate part attached to the one end of the another insertable part such that, upon the another insertable part being inserted into the opening in the assembly body, the plate part is adjacent to the lip part of the assembly body, the plate part having at least one opening formed therein that opens into the opening in the another insertable part, (3) a plurality of sidewalls each joined at one end thereof to the plate part, at least one of the sidewalls having at least one side aperture formed therein, and (4) at least one roller disposed in the at least one opening in the plate part and configured to direct a cable extending through the opening in the another insertable part to further pass through the at least one side aperture of the at least one of the sidewalls, (5) a platform part disposed at an opposing end of each of the plurality of sidewalls and being configured to support the electronic device, and (6) a hold/release mechanism disposed between the plate part and the platform part and configured to hold the cable and prevent its movement when in a first setting and to release the cable and permit its movement when in a second setting.

According to a further aspect, a rotatable docking station comprises (a) a swivel mount assembly for rotational mounting of an electronic device to a mounting structure, the swivel mount assembly comprising: (1) an assembly body, comprising: (A) an insertable part configured to be inserted into an opening in the mounting structure, the opening extending from a first surface of the mounting structure to an opposing second surface of the mounting structure, the insertable part having a shape that conforms to a shape of the opening, (B) a lip part attached to an end of the insertable part and being wider than the opening in the mounting structure such that, upon the insertable part being inserted into the opening, the lip part rests on the first surface; (2) a securing body configured to secure the assembly body to the mounting structure; and (3) a rotatable body configured to be rotatable about an axis extending through the opening in the mounting structure, the rotatable body comprising: (A) another insertable part configured to be inserted into an opening in the insertable part of the assembly body, the another insertable part having an opening that extends from one end of the another insertable part to an opposing end of the another insertable part, (B) a plate part attached to the one end of the another insertable part such that, upon the another insertable part being inserted into the opening in the assembly body, the plate part is adjacent to the lip part of the assembly body, the plate part having at least one opening formed therein that opens into the opening in the another insertable part, (C) a plurality of sidewalls each joined at one end thereof to the plate part, at least one of the sidewalls having at least one side aperture formed therein, and (D) at least one roller disposed in the at least one opening in the plate part, (E) a platform part disposed at an opposing end of each of the plurality of sidewalls and being configured to support the electronic device, and (F) a hold/release mechanism disposed between the plate part and the platform part; and (b) at least one cable retractor coupled to another end of the another insertable part of the rotatable body, the at least one cable retractor comprising: (1) a frame having first and second frame ends, opposing first and second frame walls disposed between the first and second frame ends, and a track extending along one of the first and second frame walls, (2) a slideable block disposed in, and configured to slide along, the track, (3) a first pulley coupled to the slideable block and rotatable about a first axis that moves together with the slidable block, (4) at least one spring spool mounted at the first frame end, (5) a coiled spring having a coiled part wound around the at least one spring spool, and having a segment that extends away from the coiled part and is coupled to the slideable block, and (6) a second pulley disposed at the second frame end and rotatable about a fixed second axis, (c) wherein (1) an intermediate storage section of a cable is ordinarily disposed within the frame of the at least one retractor and wound around at least part of each of the first and second pulleys, (2) a first end of the cable extends through a first opening located in one of the first and second frame walls, and (3) a second end of the cable extends through a second opening located at the second frame end and through the further cylindrical tube of the another insertable part, the at least one roller being configured to direct the second end of the cable to further pass through the at least one side aperture of the at least one of the sidewalls, (4) in response to the second end of the cable being pulled away from the at least one aperture in the at least one of the sidewalls of the rotatable body, the first pulley and the slideable block are urged away from the first frame end toward the second frame end thereby permitting a portion of the intermediate storage section of the cable to be withdrawn from the rotatable docking station, and (5) the hold/release mechanism comprises (i) a flat piece located between the roller and the aperture and adjacent to one side of the cable, (ii) a cam located between the roller and the aperture and adjacent to another side of the cable, the cam being rotatable about a pivot, (iii) a spring coupled to the cam and configured to drive the cam to turn about the pivot such that a nose part of the cam presses on the cable and holds it against the flat piece, thereby preventing movement of the cable, (iv) a sliding piece configured to slide in a further opening in one of the plurality of sidewalls, and (v) a bar coupled at one end to the sliding piece and coupled at another end to the cam such that in response to the sliding piece being moved in the further opening along a first direction, the bar pulls on the cam to turn the nose part away from the cable, thereby allowing the cable to move freely, and in response to the sliding piece moving in the opening along a second direction opposite to the first direction, the nose part of the cam again presses on the cable and holds it against the flat piece, thereby preventing further movement of the cable.

According to another aspect, a rotatable docking station comprises (a) a swivel mount assembly for rotational mounting of an electronic device to a mounting structure, the swivel mount assembly comprising: (1) an assembly body, comprising: (A) an insertable part configured to be inserted into an opening in the mounting structure, the opening extending from a first surface of the mounting structure to an opposing second surface of the mounting structure, the insertable part having a shape that conforms to a shape of the opening, (B) a lip part attached to an end of the insertable part and being wider than the opening in the mounting structure such that, upon the insertable part being inserted into the opening, the lip part rests on the first surface; (2) a securing body configured to secure the assembly body to the mounting structure; and (3) a rotatable body configured to be rotatable about an axis extending through the opening in the mounting structure, the rotatable body comprising: (A) another insertable part configured to be inserted into an opening in the insertable part of the assembly body, the another insertable part having an opening that extends from one end of the another insertable part to an opposing end of the another insertable part, (B) a plate part attached to the one end of the another insertable part such that, upon the another insertable part being inserted into the opening in the assembly body, the plate part is adjacent to the lip part of the assembly body, the plate part having at least one opening formed therein that opens into the opening in the another insertable part, (C) a plurality of sidewalls each joined at one end thereof to the plate part, at least one of the sidewalls having at least one side aperture formed therein, and (D) at least one roller disposed in the at least one opening in the plate part, (E) a platform part disposed at an opposing end of each of the plurality of sidewalls and being configured to support the electronic device, and (F) a hold/release mechanism disposed between the plate part and the platform part; and (b) at least one cable retractor coupled to another end of the another insertable part of the rotatable body, the at least one cable retractor comprising: (1) a frame having first and second frame ends, opposing first and second frame walls disposed between the first and second frame ends, and a track extending along one of the first and second frame walls, (2) a slideable block disposed in, and configured to slide along, the track, (3) a first pulley coupled to the slideable block and rotatable about a first axis that moves together with the slidable block, (4) at least one spring spool mounted at the first frame end, (5) a spring having a coiled part wound around the at least one spring spool, and having a segment that extends away from the coiled part and is coupled to the slideable block, and (6) a second pulley disposed at the second frame end and rotatable about a fixed second axis, (c) wherein (1) an intermediate storage section of a cable is ordinarily disposed within the frame of the at least one retractor and wound around at least part of each of the first and second pulleys, (2) a first end of the cable extends through a first opening located in one of the first and second frame walls, and (3) a second end of the cable extends through a second opening located at the second frame end and through the further cylindrical tube of the another insertable part, the at least one roller being configured to direct the second end of the cable to further pass through the at least one side aperture of the at least one of the sidewalls, (4) in response to the second end of the cable being pulled away from the at least one aperture in the at least one of the sidewalls of the rotatable body, the first pulley and the slideable block are urged away from the first frame end toward the second frame end thereby permitting a portion of the intermediate storage section of the cable to be withdrawn from the rotatable docking station, and (5) the hold/release mechanism comprises (i) a flat piece located between the roller and the aperture and adjacent to one side of the cable, (ii) a movable piece located between the roller and the aperture and adjacent to another side of the cable, (iii) a spring coupled at one end to the plate part and at another end to the movable piece and configured to press the movable piece against the cable to hold the cable against the flat piece, thereby preventing movement of the cable, (iv) a push button configured to move in and out through a further opening in one of the plurality of sidewalls, and (v) a lever arm movable about a pivot and coupled at one end to the push button and coupled at another end to the movable piece such that in response to the push button being pushed toward the opening, the lever arm turns about the pivot and moves the movable piece away from the cable, thereby allowing the cable to move freely, and in response to the push button being released, the lever arm turns about the pivot to allow the spring to push the movable piece back against the cable, thereby preventing further movement of the cable.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

FIGS. 1A-1D are front, rear and side elevation views of a rotatable docking station with retractors attached in accordance with an embodiment.

FIG. 2A is a close-up side elevation view of the swivel mount assembly shown in FIGS. 1A-1D.

FIG. 2B is a close-up side elevation view of the swivel mount assembly shown in FIG. 2A showing the rotatable body removed from the assembly body in accordance with an embodiment.

FIG. 3 is a top plan view of the swivel mount assembly shown in FIGS. 2A-2B.

Figure 4B:
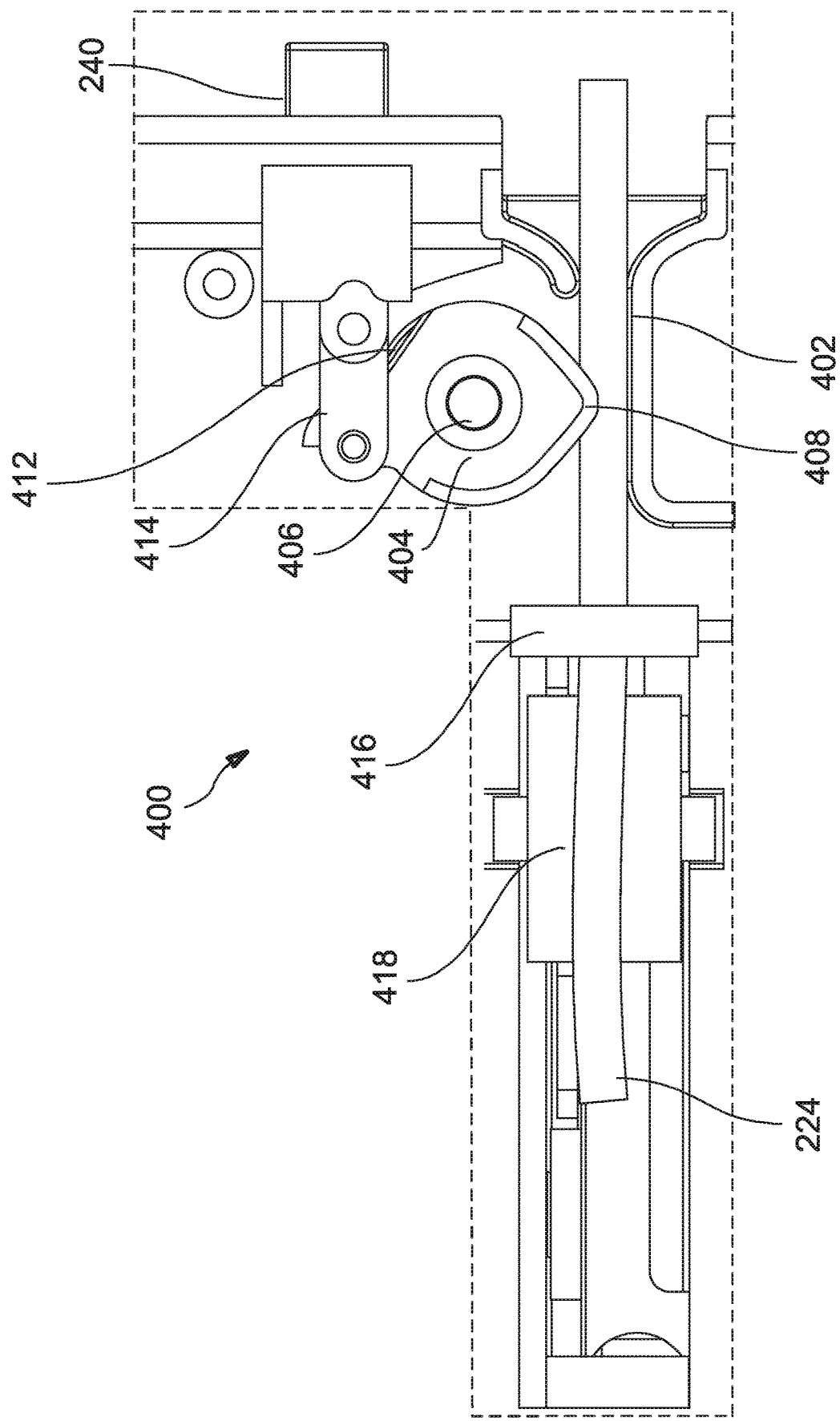

FIG. 4A is a top plan view of the swivel mount assembly shown in FIG. 3 with the platform part removed in accordance with an embodiment FIG. 4B is an enlarged view of the hold/release mechanism shown in FIG. 4A.

FIGS. 5A, 5B and 5C are perspective, top plan and side elevation views, respectively, of a swivel mount assembly with the platform part removed in accordance with another embodiment.

Figure 5D:
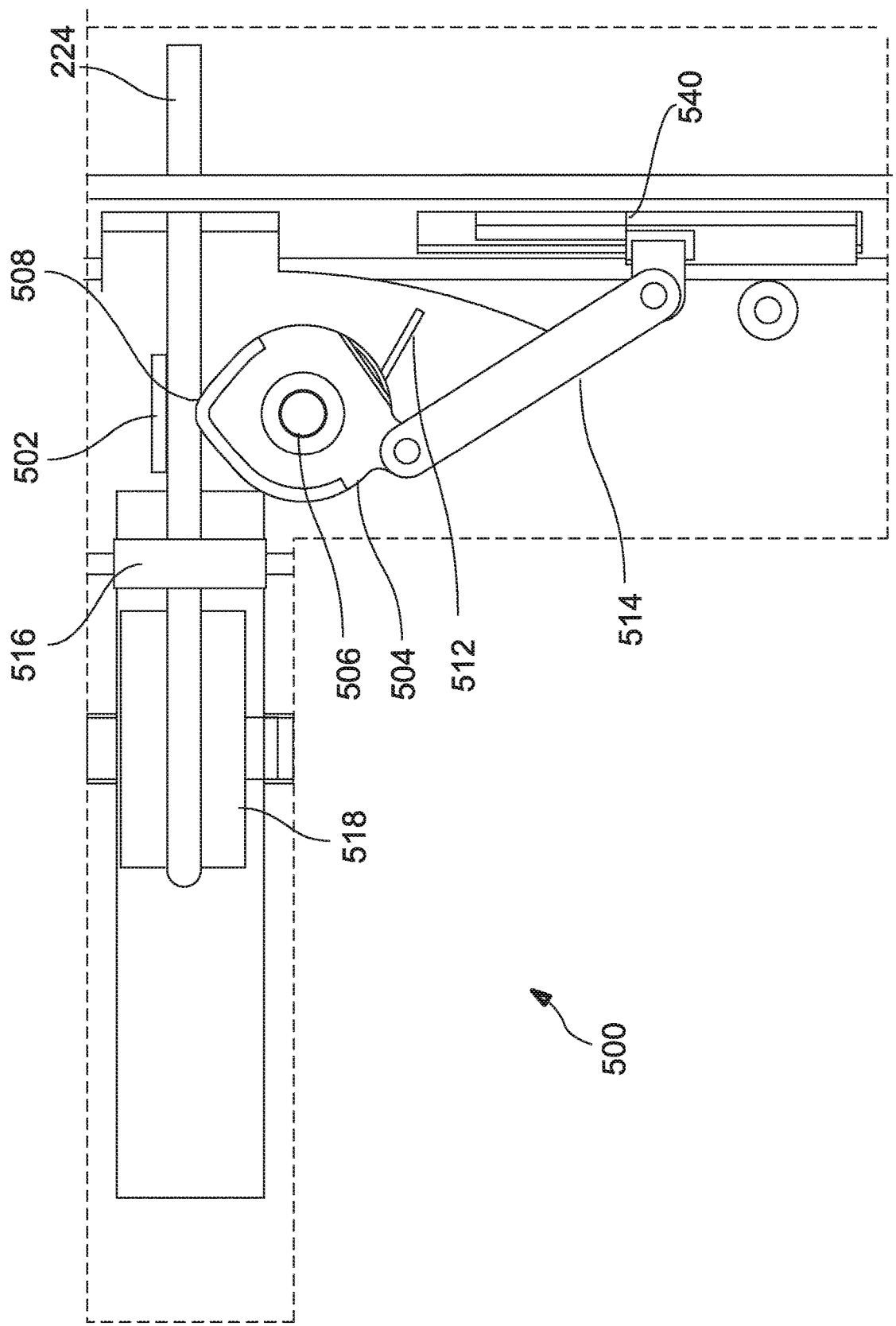

FIG. 5D is an enlarged view of the hold/release mechanism shown in FIGS. 5A-5C.

FIGS. 6A, 6B and 6C are perspective, top plan and side elevation views, respectively, of a swivel mount assembly with the platform part removed in accordance with yet another embodiment.

Figure 6D:
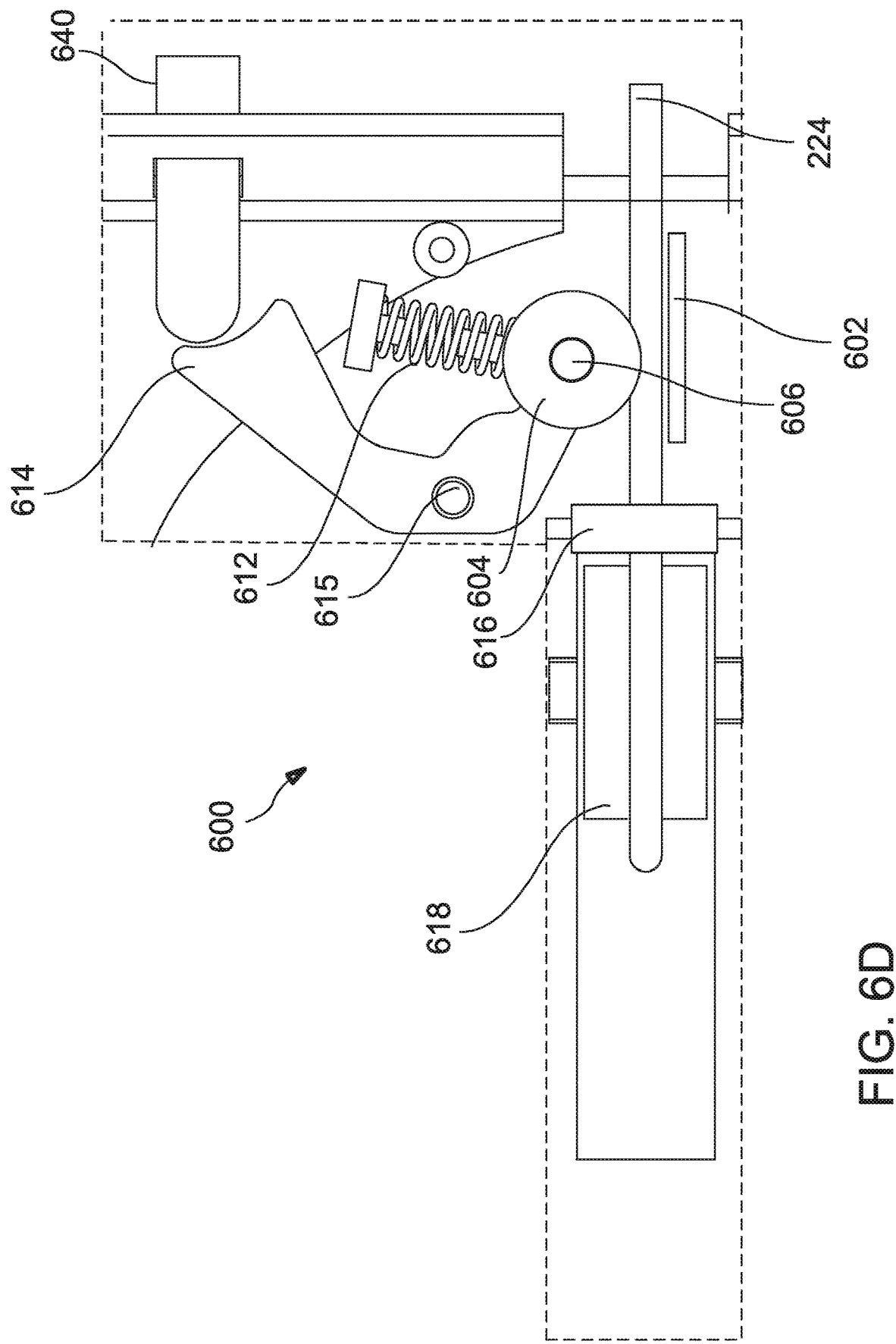

FIG. 6D is an enlarged view of the hold/release mechanism shown in FIGS. 6A-6C.

Figure 7A:
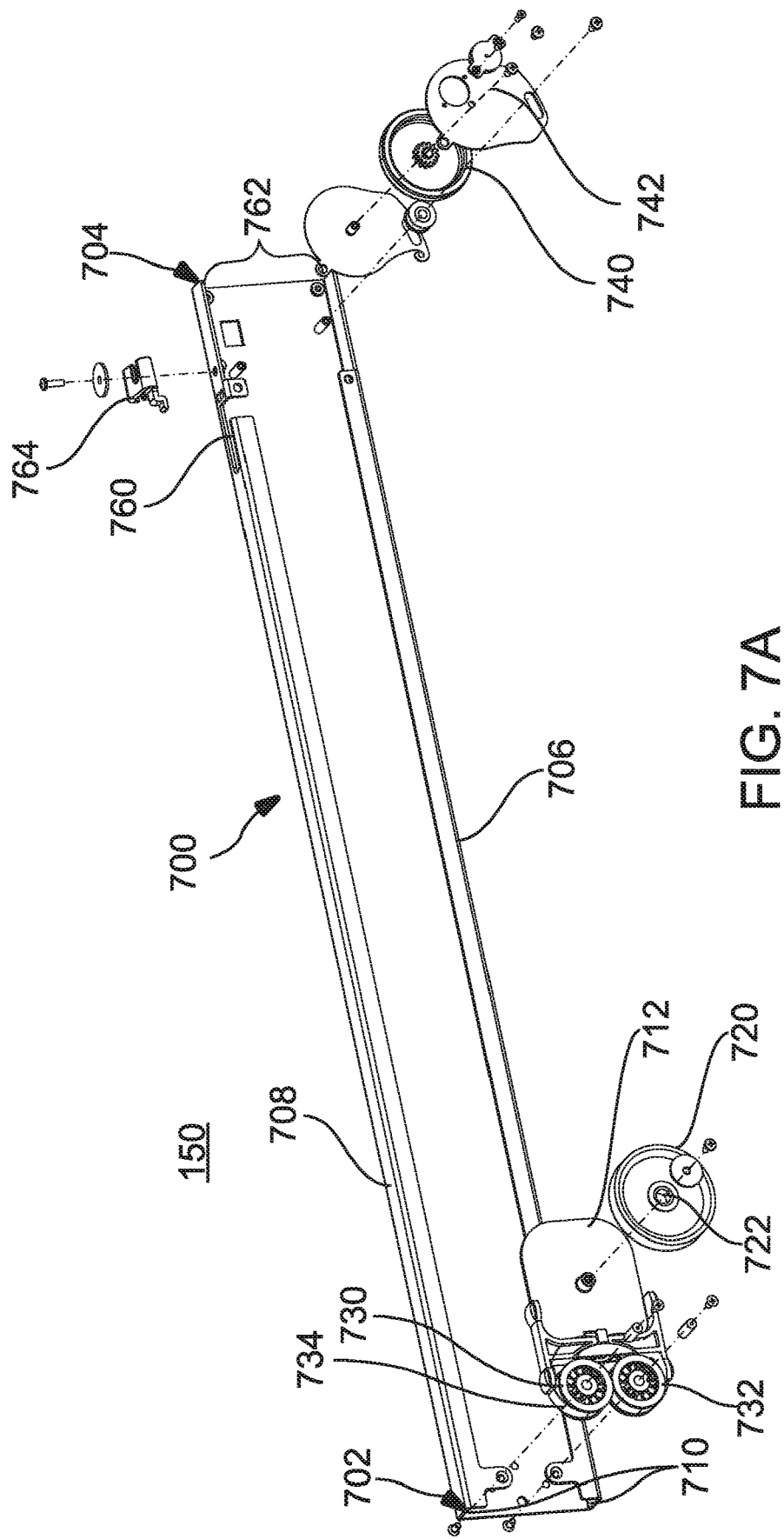

FIG. 7A is an exploded view of one of the retractors shown in FIGS. 1A-1D in accordance with an embodiment.

Figure 7B:
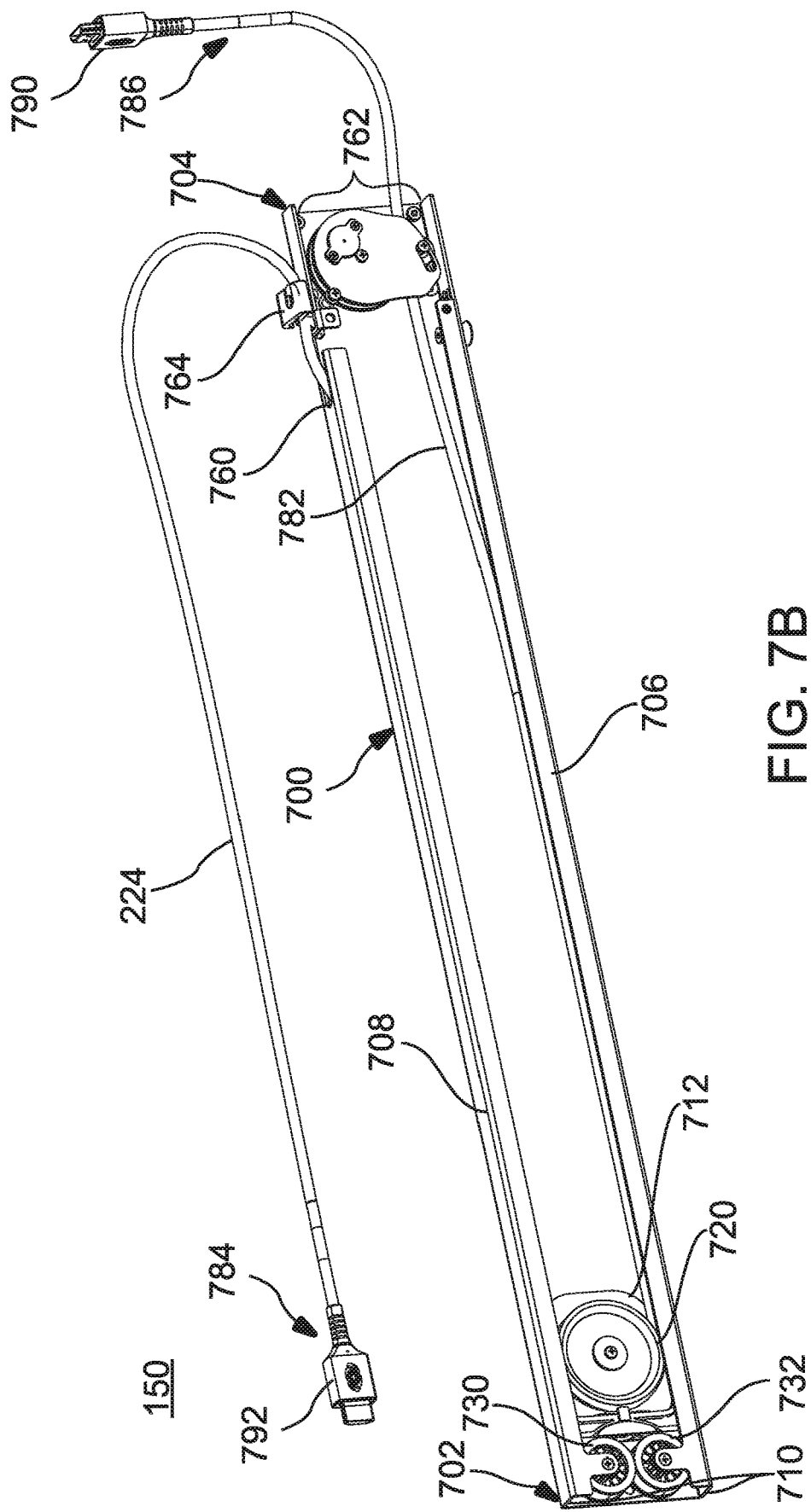

FIG. 7B is a perspective view of the retractor shown in FIG. 7A with a side panel removed.

Figure 7C:
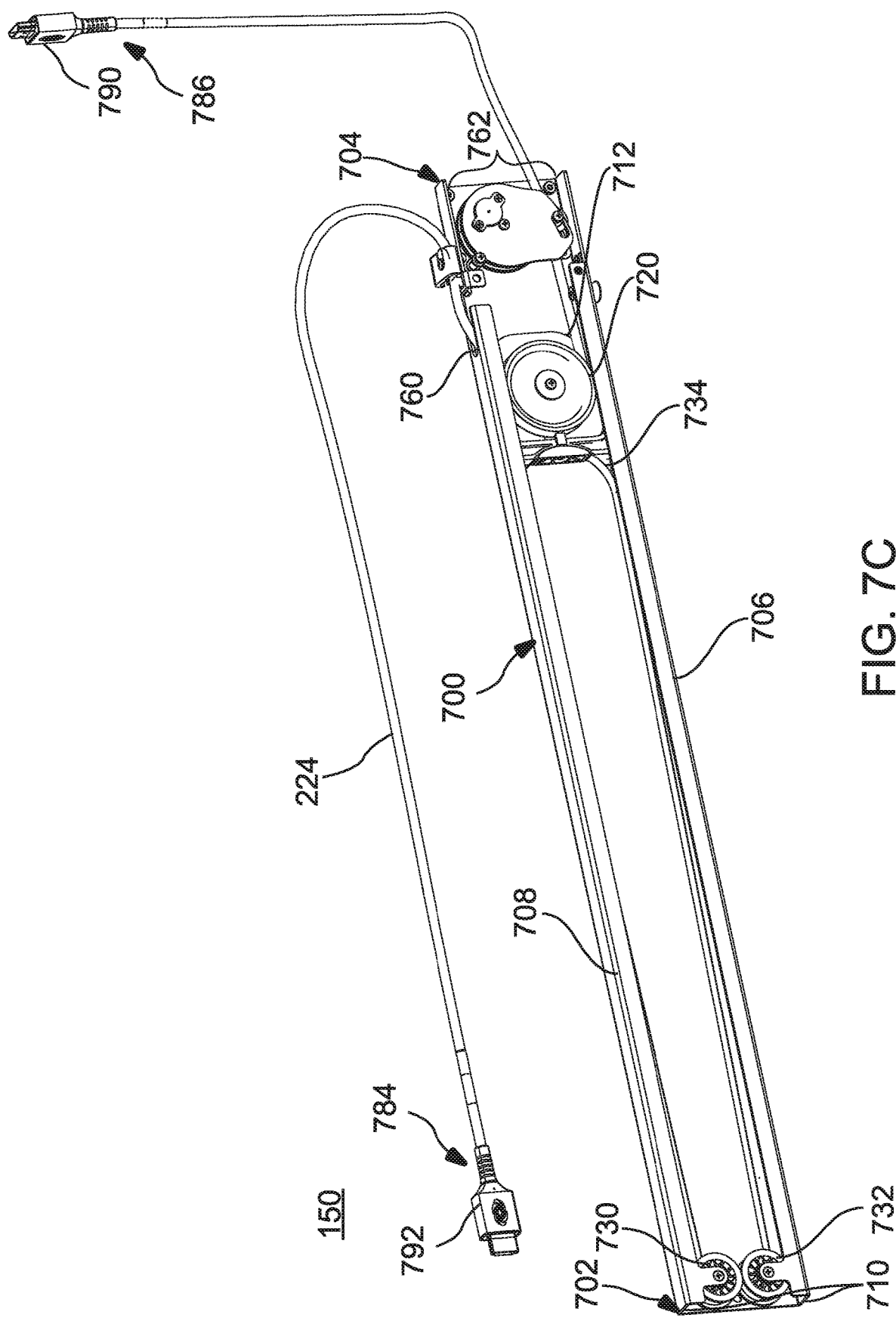

FIG. 7C is a perspective view of the retractor shown in FIG. 7A with a side panel removed and the cable fully withdrawn from the retractor.

FIG. 8 is a perspective view showing the mounting of the rotatable docking station with retractors in an opening in a surface in accordance with an embodiment.

Figure 9B:
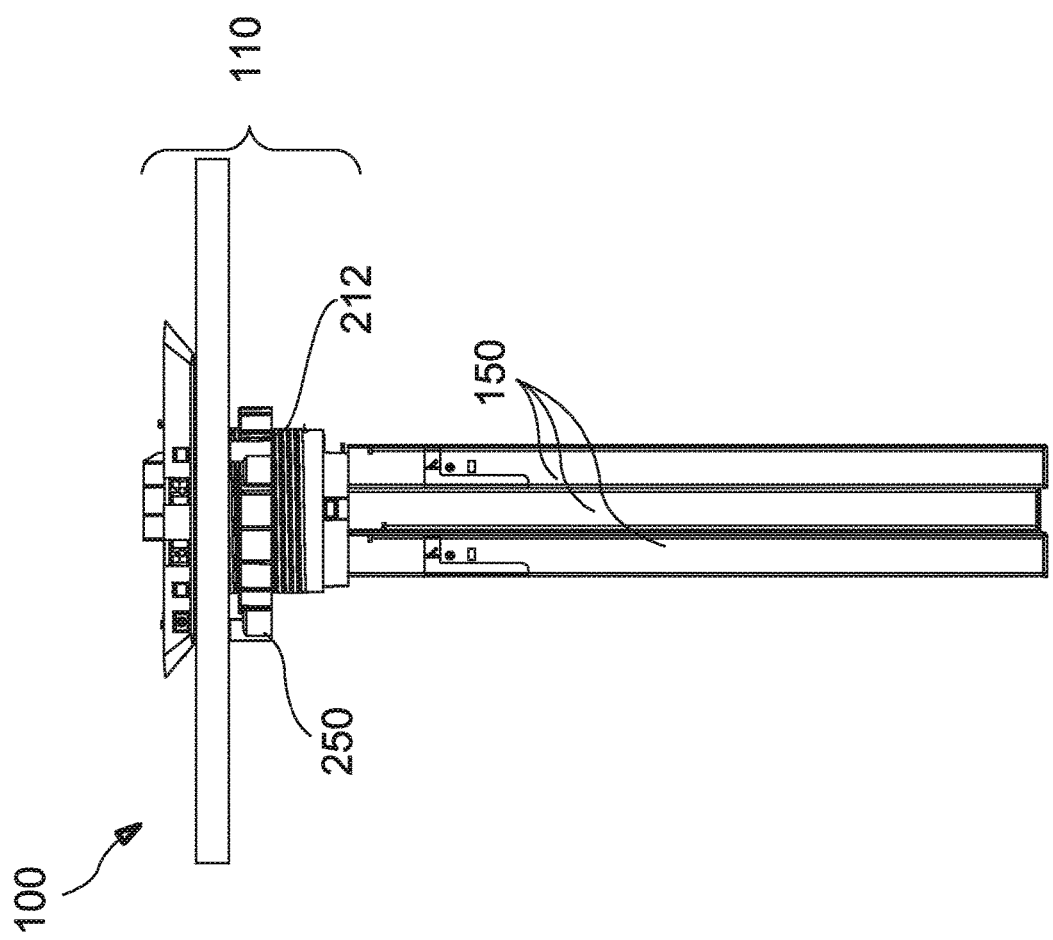
Figure 9A:
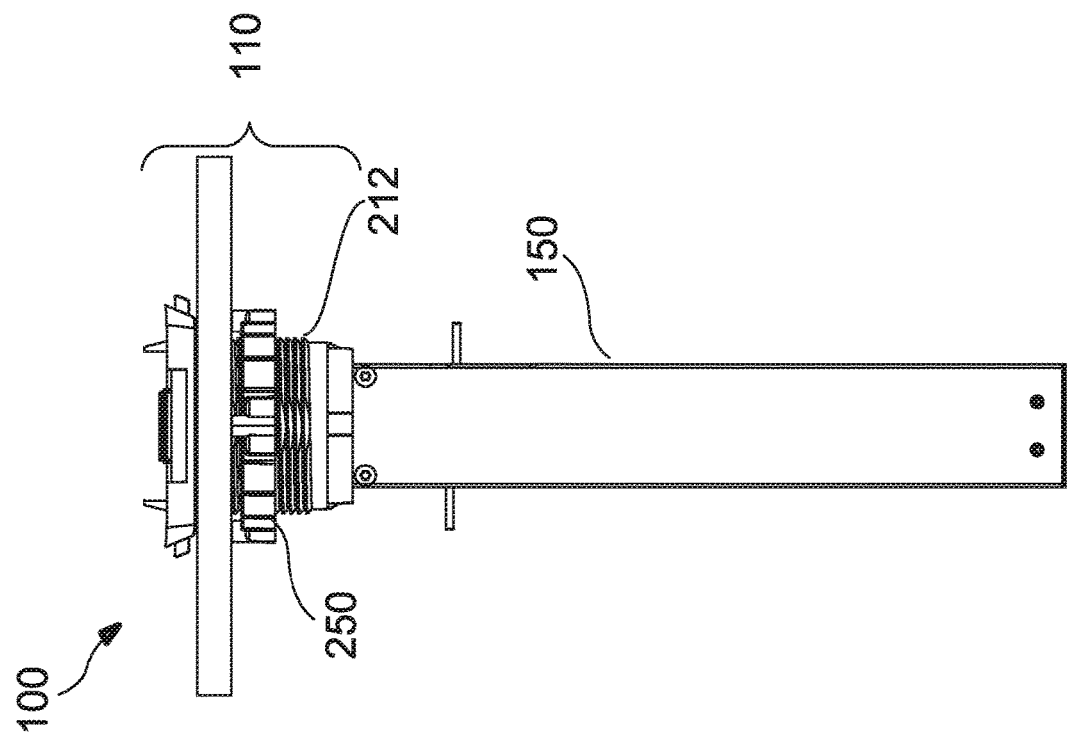
Figure 9D:
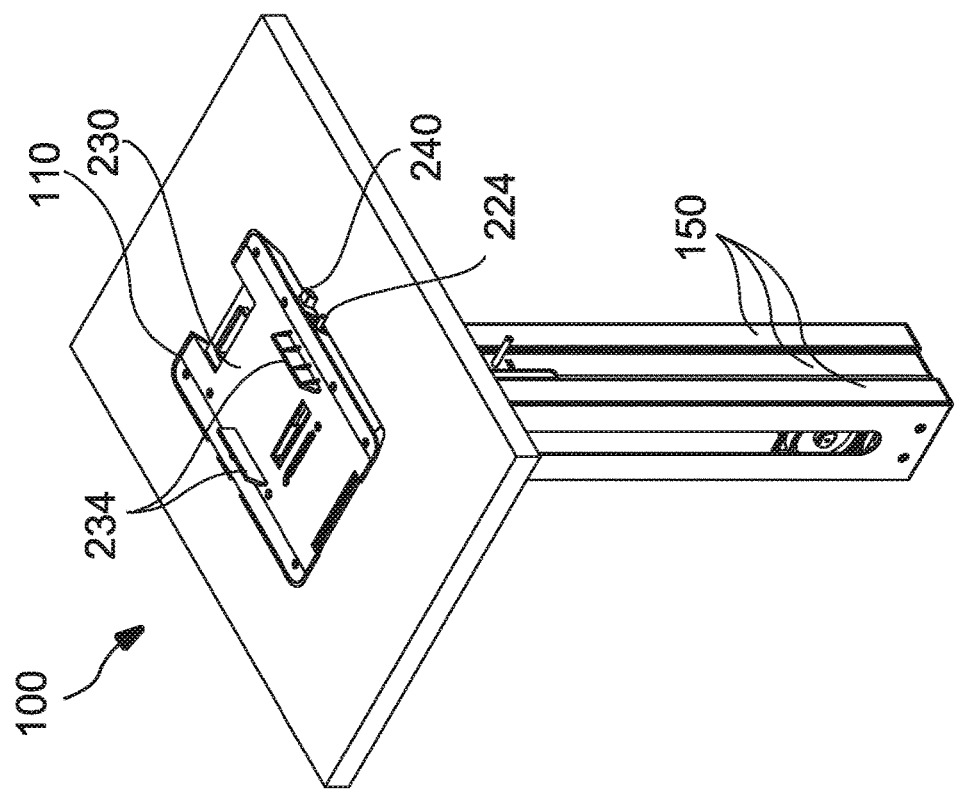
Figure 9C:
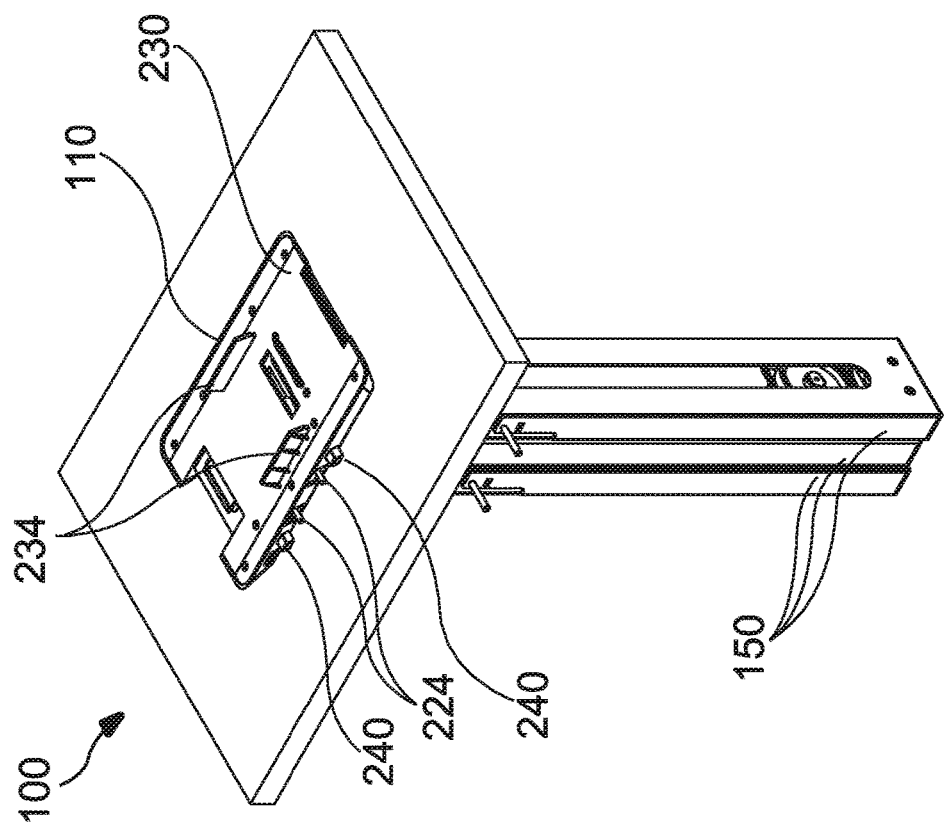

FIGS. 9A-9B are side elevation views and FIGS. 9C-9D are perspective views showing the rotatable docking station with retractors mounted in an opening in a surface in accordance with an embodiment.

Figure 10A:
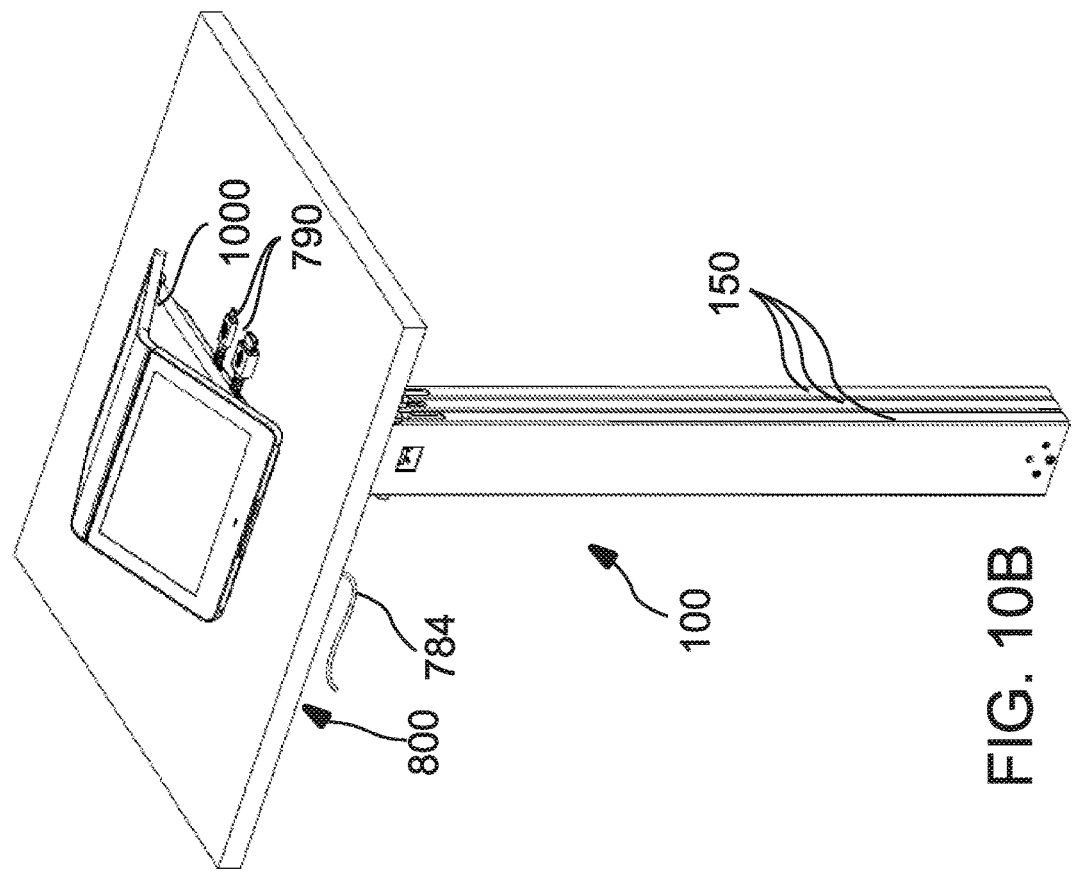
Figure 10B:
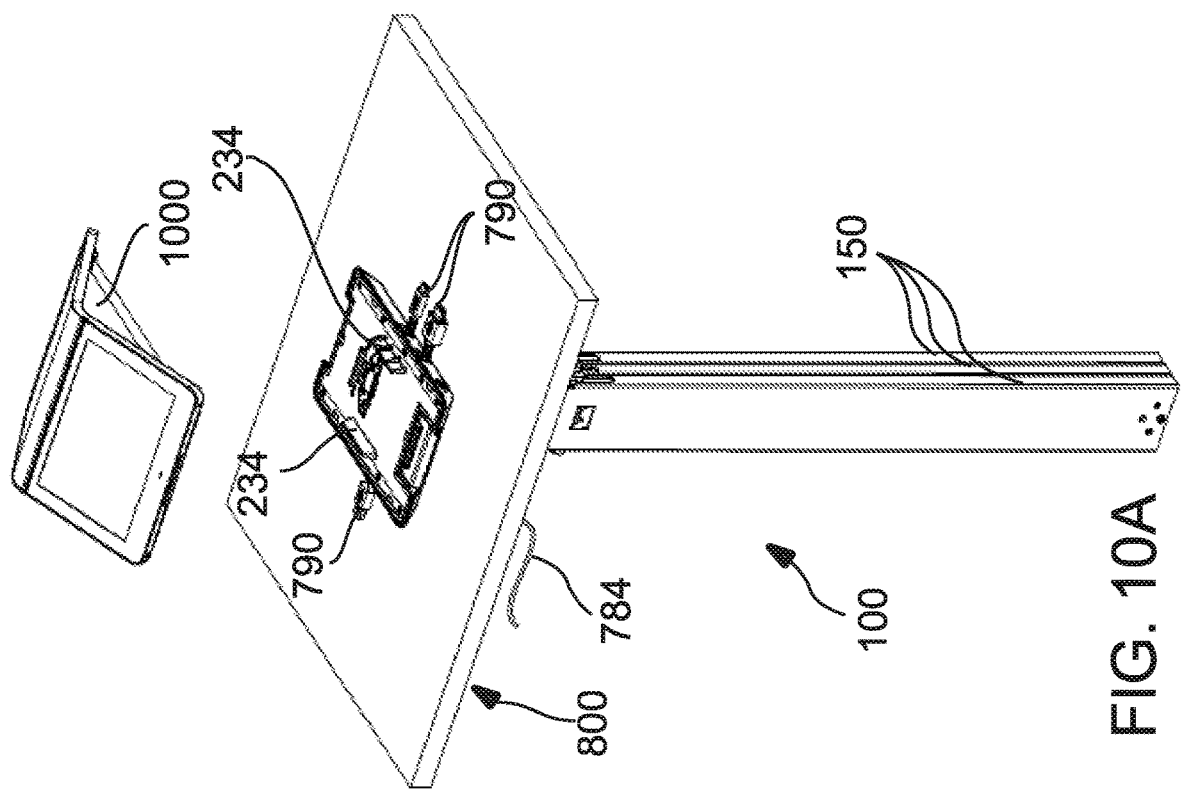

FIGS. 10A-10B are perspective views showing the mounting of an electronic device atop the mounted rotatable docking station with retractors in accordance with an embodiment.

DETAILED DESCRIPTION OF THE INVENTION

The present embodiments provide a rotatable docking station for rotatably supporting electronic devices and providing rotatable electrical and data connections to the electronic device while also providing additional retractable electrical and data connections for other devices.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.

100 Rotatable Docking Station With Cable Retractors
110 Swivel Mount Assembly
150 Cable Retractor
202 Rotatable Body
208 Cylindrical Region of Rotatable Body
210 Insertable Part
211 Cylindrical Region of Insertable Part
212 Threads
214 Lip Part
220 Plate Part
222 Side Walls
224 Cables
226 Side Wall Apertures
230 Platform Part
232 Platform Part Apertures
234 Extensions
240 Push Button
250 Threaded Securing Body
400 Hold/Release Mechanism
402 Flat Piece
404 Cam
406 Cam Pivot
408 Cam Nose
412 Spring
414 Arm
416 Roller
418 Roller
500 Hold/Release Mechanism
502 Flat Piece
504 Cam
506 Cam Pivot
508 Cam Nose
510 Insertable Part
512 Spring
514 Arm
516 Roller
518 Roller
520 Plate Part
522 Side Walls
526 Side Wall Apertures
540 Slider
600 Hold/Release Mechanism
602 Flat Piece 604 Cam
606 Cam Pivot
610 Insertable Part
612 Spring
614 Arm
615 Arm Pivot
616 Roller
618 Roller
620 Plate Part
622 Side Walls
626 Side Wall Apertures
640 Push Button
700 Retractor Frame
702 First Frame End
704 Second Frame End
706 First Frame Wall
708 Second Frame Wall
710 Track
712 Slideable Block
720 Single First Pulley
722 First Axis
730 First Spring Spool
732 Second Spring Spool
734 Spring
740 Single Second Pulley
760 First Opening
762 Second Opening
764 Clip/Clamp
782 Intermediate Storage Section of Cable
784 First End of Cable
786 Second End of Cable
790 Free Connectors
792 Hidden Connectors
800 Mounting Structure
802 Mounting Structure Opening
804 First Surface
806 Second Surface
820 Electronic Device

MODE(S) FOR CARRYING OUT THE INVENTION

The embodiment described herein in the context of a rotatable docking station with cable retractors, but is not limited thereto, except as may be set forth expressly in the appended claims.

Figure 1A:
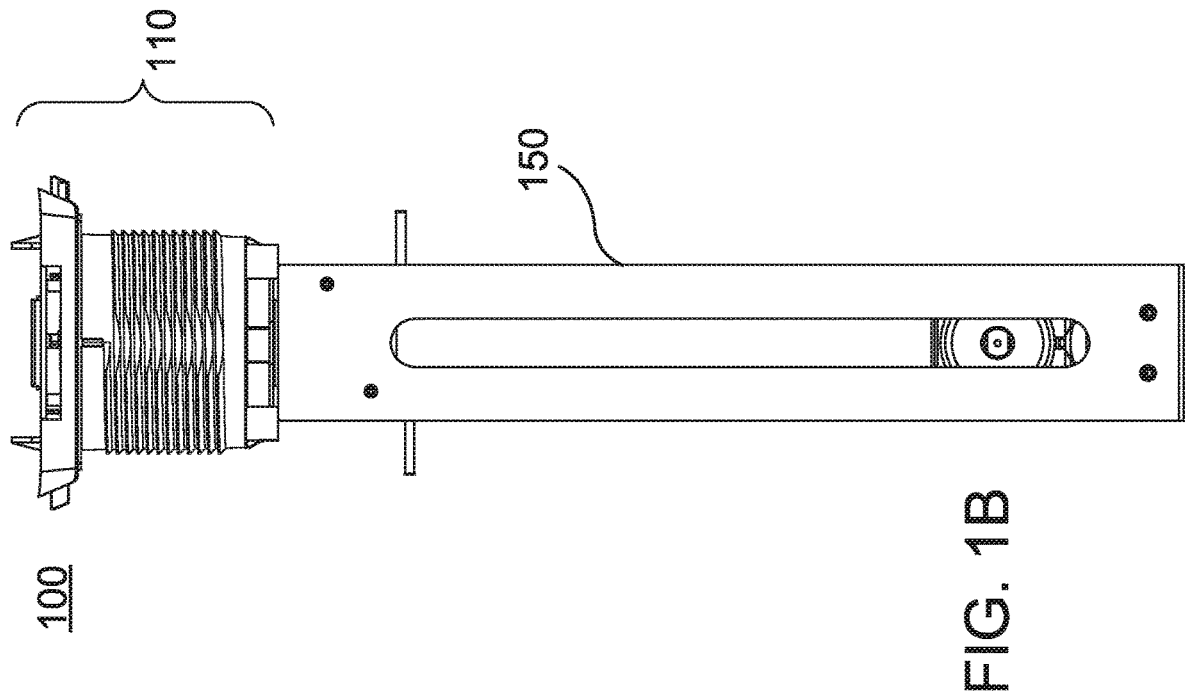
Figure 1B:
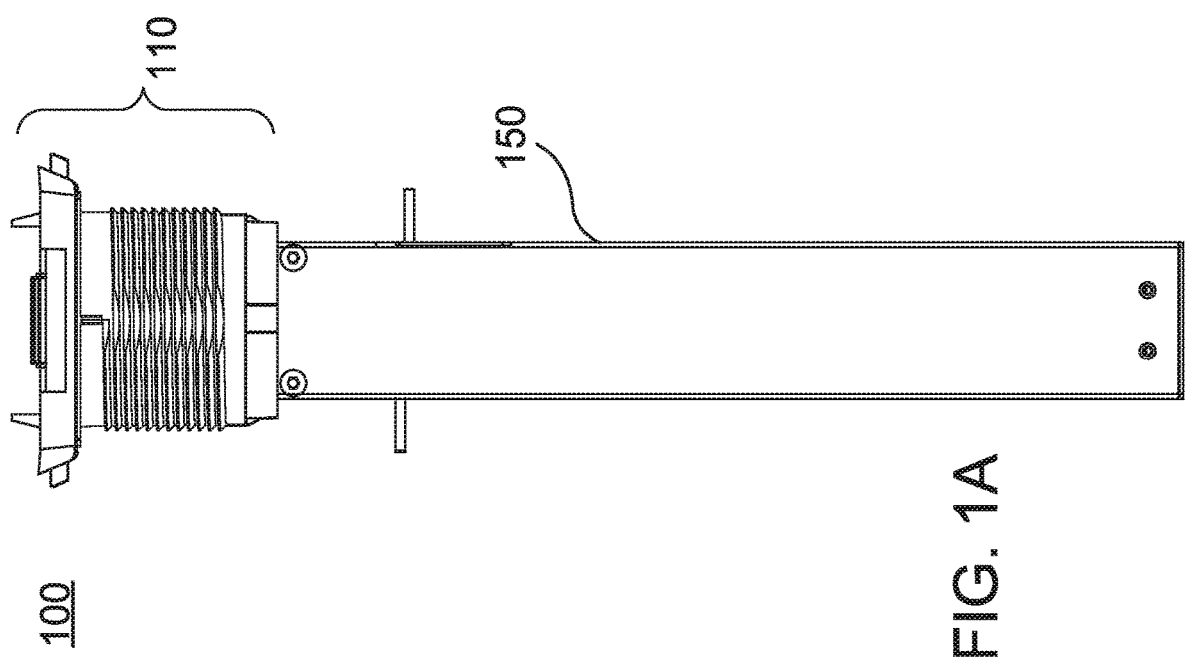
Figure 1C:
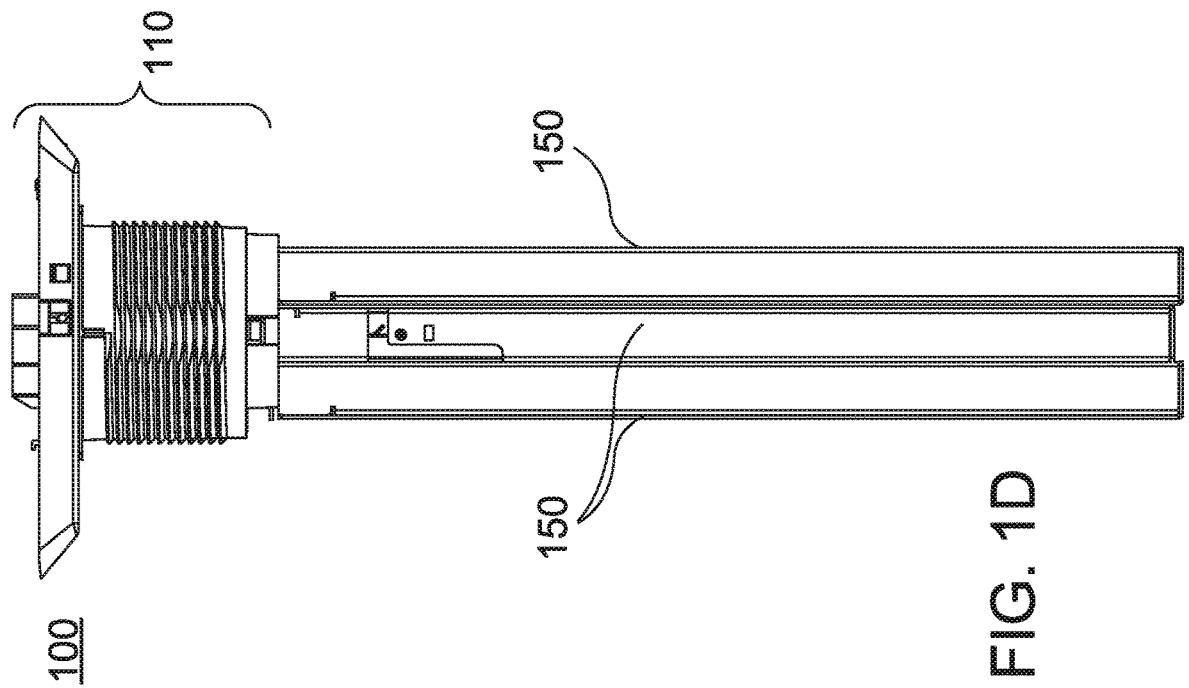
Figure 1D:
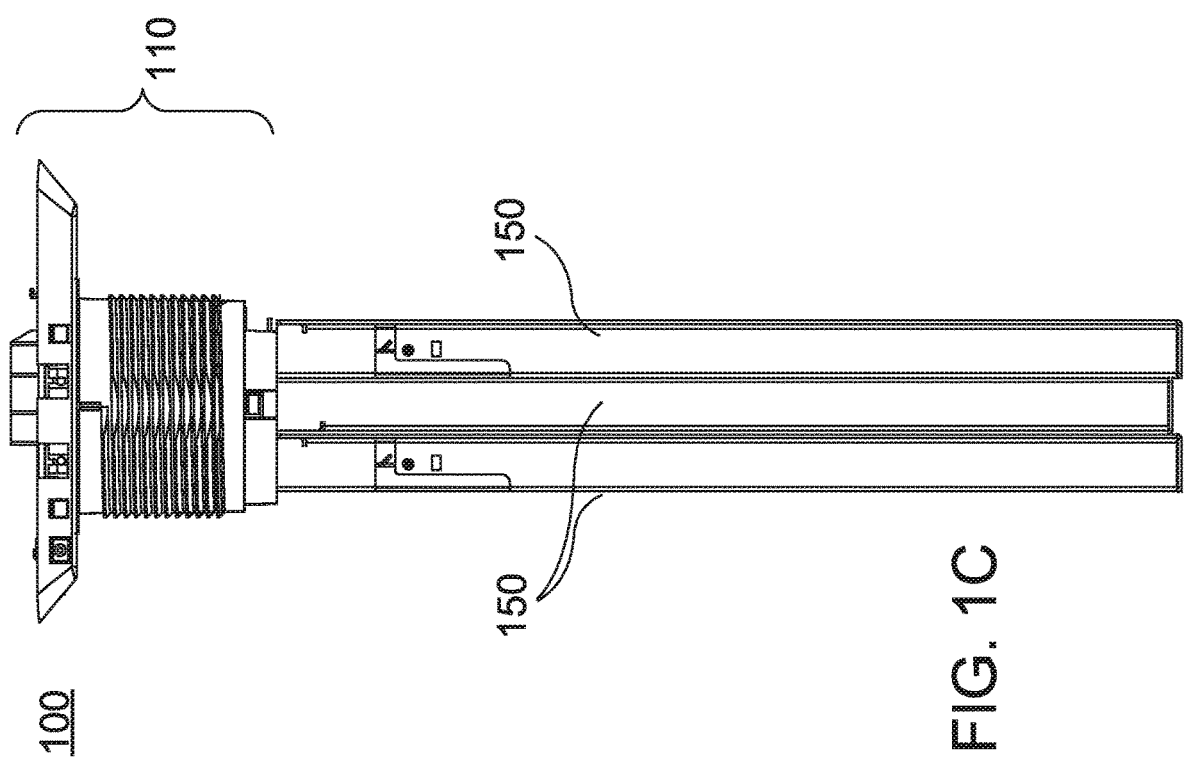

Referring first to FIGS. 1A-1D, a rotatable docking station 100 is shown in accordance with an embodiment. FIGS. 1A and 1B illustrate front and rear elevation views, respectively, of the rotatable docking station 100, and FIGS. 1C and 1D depict side elevation views of the rotatable docking station 100.

The rotatable docking station 100 includes a swivel mount assembly 110, according to an embodiment. One or more cable retractors 150 are also included according to an embodiment. In FIGS. 1A and 1B, three such cable retractors 150 are shown. Alternatively, only one or two cable retractors 150 may be provided.

FIGS. 2A-2B show in greater detail the swivel mount assembly 110 depicted in FIGS. 1A-1D. The swivel mount assembly 110 includes a rotatable body 202 and an insertable part 210 shown assembled in, e.g., FIG. 2A, and shown disassembled in FIG. 2B. The insertable part 210 is configured to be inserted at one end into an opening in a surface of a table top, desk top, or other structure. Typically, the opening extends completely through the table top, desk top, or other structure, and the insertable part 210 typically has a shape that corresponds to the shape of the opening to permit the insertable part 210 to fit into the opening. According to an embodiment, the insertable part 210 may be cylindrical-shaped for insertion into a corresponding circular opening and includes a cylindrical portion 211. For example, FIG. 8 shows a mounting structure 800, which may be a portion of the table top, desk top, or other structure, having a circular opening 802 into which the cylindrical portion 211 is inserted.

Referring back to FIGS. 2A-2B, a lip part 214 is located at one end of the end of the cylindrical portion 211 and may be integral with or coupled to the cylindrical portion 211. The lip part 214 is typically wider than the opening in the mounting structure so that the lip part 204 rests on a surface of the mounting structure after the insertable part is inserted into the opening. For example, in FIG. 8, the lip part 204 is suitable to rest on a first surface 804 of the mounting structure 800.

Referring again to FIGS. 2A-2B, the outer surface of the cylindrical portion 211 typically includes threads 212 over which, for example, a ring-shaped securing body 250 that has compatible threads may be turned. For example, as FIGS. 8 and 9A-9B show, after the insertable part 210 is inserted into the opening 802 and the lip part 204 rests upon the first surface 804 of the mounting structure 800, the threaded securing body 250 may be turned along the threads 212 until it is secured against the second surface 806 of the mounting structure 800 and secures the lip part 204 to the first surface of 804.

Returning again to FIGS. 2A-2B, the swivel mount assembly 110 also includes a rotatable body 202 that is configured to be inserted into an opening in the cylindrical portion 211 of the insertable part 210. The rotatable body 202 includes a cylindrical portion 208 having an outer surface that is configured to be rotatable in the opening in the cylindrical portion 211. At one end of the cylindrical portion 208, a plate part 220 is integral with, or coupled to, the cylindrical portion 208. A plurality of side walls 222 extend away from, and may be integral with, the plate part 220.

FIG. 3 shows a top view of the swivel mount assembly 110. A platform part 230 is disposed at the ends of the sidewalls 222 and covers the plate part 220 in the rotatable body 202. Extensions 234, which extend from the platform part 230, may also be provided to permit the electronic device to be attached to the platform part 230.

One or more side wall apertures 226 are provided in at least one of the side walls 222 and provide openings through which a free end of a retractor cable 224 passes. Each side wall aperture 226 is typically wider than the width of one of the retractor cables 224 but is narrower than a connector (not shown) disposed at the free end of the cable to prevent the connector from being drawn into the swivel mount assembly 110 and the retractor 150 when the cable is retracted.

FIG. 4A shows the top view of the swivel mount assembly 110 shown in FIG. 3 but with the platform part 230 removed to display the routing of the cable 224 through it and display the hold/release mechanisms 400. FIG. 4B is an enlarged view of one of the hold/release mechanisms 400. The hold/release mechanism 400 includes a flat portion 402, a cam 404 that is pivotable about a pivot 406, a spring 412, an arm 414, and a push button 240.

The cable 224 passes upward from the retractor 150 and through the opening within the cylindrical region 211 of the insertable part 210, and then passes over a roller 418 and under a roller 416. The cable 224 then passes between the flat portion 402 and the cam 404 before exiting the swivel mount assembly 110 through the side wall aperture 226.

Ordinarily, the hold/release mechanism 400 prevents the cable 224 from being drawn into the retractor. As the cable 224 passes between the flat portion 402 and the cam 404, the spring 412 drives the cam 404 about the pivot 404 such that the nose 408 of the cam 404 presses against the cable 224 and holds the cable 224 against the flat portion 402. By holding the cable in this manner, the hold/release mechanism 400 ordinarily prevents the cable 224 from being further pulled into the retractor 150.

A further portion of the cable 224 may then be withdrawn from the retractor by pulling on the cable 224, which causes the cam 404 to turn and move the nose 408 of the cam 404 away from the flat portion 402 as well as push against the spring 212. Then, upon release of the cable 224, the spring 412 again drives the cam about the pivot 406 so that the nose 408 again presses against the cable and prevents the newly withdrawn portion from being pulled back into the retractor 150.

To permit some or all of the withdrawn portions of the cable to be returned into the retractor 150, a user presses on the push button 240. The push button 240 is coupled to the arm 414 which, in turn, is coupled to the cam 404. Pressing on the push button 240 translates the arm 414 which causes the cam to turn about the pivot 406 so that the nose 408 no longer presses against the cable 224 and no longer holds the cable 224 in place against the flat portion 402. As a result, the retractor is able to draw in the cable 224 until either the push button 240 is released or until all of the withdrawn part of the cable has been retracted.

FIGS. 5A-5D show a top portion of a swivel mount assembly 510 according to another embodiment. FIGS. 5A-5C respectively show perspective, top plan, and partial side views of the swivel mount assembly 510 with its platform part (not shown) removed. The swivel mount assembly 510 includes side walls 522, and side wall apertures 526 through which the cables 224 exit the swivel mount assembly 510, as well as one or more hold/release mechanisms 500. FIG. 5D is an enlarged view of one of the hold/release mechanisms 500. The hold/release mechanism 500 includes a flat portion 502, a cam 504 that is pivotable about a pivot 506, a spring 512, an arm 514, and a slider 540.

The cable 224 passes upward from the retractor 150 and through the opening within the cylindrical region 211 of the insertable part 210, and then passes over a roller 518 and under another roller 516. The cable 224 then passes between the flat portion 502 and the cam 504 before exiting the swivel mount assembly 110 through the side wall aperture 526.

Ordinarily, the hold/release mechanism 500 prevents the cable 224 from being drawn into the retractor 150. As the cable 224 passes between the flat portion 502 and the cam 504, the spring 512 drives the cam 504 about the pivot 504 such that the nose 508 of the cam 504 presses against the cable 224 and holds the cable 224 against the flat portion 502. By holding the cable in this manner, the hold/release mechanism 500 ordinarily prevents the cable 224 from being further pulled into the retractor 150.

A further portion of the cable 224 may then be withdrawn from the retractor by pulling on the cable 224, which causes the cam 504 to turn and move the nose 508 of the cam 504 away from the flat portion 502 as well as push against the spring 512. Then, upon release of the cable 224, the spring 512 again drives the cam about the pivot 506 so that the nose 508 again presses against the cable and prevents the newly withdrawn portion from being pulled back into the retractor 150.

To permit some or all of the withdrawn portion of the cable to be returned into the retractor 150, a user slides the slider 540. The slider 540 is coupled to the arm 514 which, in turn, is coupled to the cam 504. Moving the slider 540 causes the cam to turn about the pivot 506 so that the nose 508 no longer presses against the cable 224 and no longer holds the cable 224 in place against the flat portion 502. As a result, the retractor is able to draw in the cable 224 until either the slider 540 is released or until all of the withdrawn part of the cable has been retracted.

FIGS. 6A-6D show a top portion of a swivel mount assembly 610 according to yet another embodiment. FIGS. 6A-6C respectively show perspective, top plan, and partial side views of the swivel mount assembly 610 with its platform part (not shown) removed. The swivel mount assembly 610 includes side walls 622, and side wall apertures 626 through which the cables 224 exit the swivel mount assembly 610, as well as one or more hold/release mechanisms 600. FIG. 6D is an enlarged view of one of the hold/release mechanisms 600. The hold/release mechanism 600 includes a flat portion 602, a cam 604 that is pivotable about a pivot 606, a spring 612, an arm 614 that is pivotable about a pivot 615, and a push button 640.

The cable 224 passes upward from the retractor 150 and through the opening within the cylindrical region 211 of the insertable part 210, and then passes over a roller 618 and under another roller 616. The cable 224 then passes between the flat portion 602 and the cam 604 before exiting the swivel mount assembly 110 through the side wall aperture 626.

Ordinarily, the hold/release mechanism 600 prevents the cable 224 from being drawn into the retractor 150. As the cable 224 passes between the flat portion 602 and the cam 604, the spring 612 drives the cam 604 about the pivot 604 such that the cam 604 presses against the cable 224 and holds the cable 224 against the flat portion 602. By holding the cable in this manner, the hold/release mechanism 600 ordinarily prevents the cable 224 from being further pulled into the retractor 150.

A further portion of the cable 224 may then be withdrawn from the retractor by pulling on the cable 224, which causes the cam 604 to turn away from the flat portion 602 as well as push against the spring 612. Then, upon release of the cable 224, the spring 612 again drives the cam 604 about the pivot 606 so that the cam 604 again presses against the cable and prevents the newly withdrawn portion from being pulled back into the retractor 150.

To permit some or all of the withdrawn portion of the cable to be returned into the retractor 150, a user pushes on the button 640. The button 640 is configured to contact the arm 614 such that pushing on the button 640 causes the arm 614 to turn about the pivot 615 which, in turn, causes the cam 604 to turn about the pivot 606 and move away from the cable 224. Thus, the cam 604 no longer holds the cable 224 in place against the flat portion 602. As a result, the retractor is able to draw in the cable 224 until either the button 640 is released or until all of the withdrawn part of the cable has been retracted.

FIGS. 7A-7C illustrates a cable retractor 150 for facilitating the withdrawal and retraction of a length of cable 224 according to an embodiment. To permit the incorporation of two or three cable retractors 150 within the space provided beneath the swivel mount assembly 110 shown in FIGS. 1A-1D, the present embodiments provide cable retractors 150 that are thinner than cable retractors known in the art.

For example, the cable retractors 150 are thinner than those described in U.S. Pat. Nos. 8,469,303, 8,469,304, and 8,469,305, each issued Jun. 25, 2013, U.S. Pat. No. 8,657,224, issued Feb. 25, 2014, U.S. Pat. No. 9,056,744, issued Jun. 16, 2015, and U.S. Pat. No. 9,475,673, issued Oct. 25, 2016, each to Feldstein, et al., the disclosures of which are incorporated herein by reference.

The cable retractor 150 provides a compartment to keep interface cables at the ready to be withdrawn and plugged into computers, AV sources, and a host of other devices. The cable retractor 150 provides for extensive connectivity in an easy pull out cable storage mechanism to support a wide range of applications and signal types. When the cable 224 is not in use, the cable 224 stows neatly within the cable retractor 150. Additionally, while cable 224 is in use, any excess of the cable 224 simply remains out-of-sight in the cable retractor 150.

The cable retractor 150 is mounted to an end portion (not shown) disposed at the end of the rotatable body 202 of the swivel mount assembly 110. One end of the cable retractor 150 is connected to end portion using, for example, brackets, clips, screws, or like fasteners. In one embodiment, the cable retractor 150 is mounted vertically below the mounting structure, such as below a conference room table or a desk.

FIG. 7A is a partially exploded perspective view of the cable retractor 150. The cable retractor 150 includes a retractor frame 700. The retractor frame 700 includes first and second frame ends 702, 704. The retractor 150 stores, within the frame 700, an intermediate storage section 782 of the cable 224. The cable 224 may be a USB cable, Ethernet cable, 15-PIN VGA (plus audio combined) HDMI cable, DVI cable, CAT-5 cable, CAT-5E cable, CAT-6 cable, optical fiber, audio cable, display port or another type of cable.

The retractor frame 700 may be made of any material that can be molded, extruded or bent, for example, a metal such as aluminum or a polymer. Example of polymers include plastics such as thermoplastic, thermoset plastic, polyurethane, polyethylene, polypropylene and engineering plastic, for example, synthetic polymers including nylon.

The cable retractor 150 includes a single first pulley 720 and a single second pulley 740. The first pulley 720 rotates independently along a first axis 722. The second pulley 740 rotates independently along a second axis 742. Only a single first pulley 720 and a single second pulley 740 are provided, rather than the paired first pulleys and paired second pulleys present in known cable retractors, to provide a thinner profile that allows space for two or three such cable retractors to be coupled to the swivel mount assembly 110. To make up for the loss in cable length storage capacity resulting from the absence of paired pulleys, the length of the retractor frame 700 is roughly double the length of the frame of the known, paired-pulley cable retractors.

FIG. 7B illustrates the cable retractor 150 with a cover of the retractor frame 700 removed. The intermediate storage section 782 of the cable 224 is at least partially wound over the first and second pulleys 720, 740. A first end 784 of the cable is disposed outside of the retractor frame 700 and extends from a first opening 760 in the retractor frame 700 to a connector 792 that is typically hidden under the mounting structure. The first end 784 is typically also be held in place against the retractor frame 700 by a clip 764.

Within the retractor frame 700, a section of the intermediate storage section 782 of the cable 224 extends from the first opening 760 to the first pulley 720 and over the first pulley 720. Another section of the intermediate storage section 782 of the cable 224 extends from the first pulley 720 to, and over, the second pulley 740. A second (free) end 786 of the cable 224 extends from the second pulley 740 through a second opening 762 in the retractor frame 700 and outside the retractor frame 700.

The first and second pulleys 720, 740 are laterally spaced apart from each other with the first pulley 720 ordinarily being disposed at the first frame end 702 of the retractor frame 700, and the second pulley 740 being disposed at the second frame end 704 of the retractor frame 700. The first pulley 720 rotates on a first axis 722 and is rotatably mounted on a slideable block 712 that is disposed in the upper and lower laterally spaced tracks 710 for sliding motion between the first and second frame ends 702, 704. The second pulley 740 rotates along a second axis 722 which is located adjacent to the second frame end 704 of the retractor frame 700.

The retractor frame 700 includes peripheral first and second frame walls 706, 708 that form the laterally spaced tracks 710. The tracks 710 each have an elongated guide recess (not shown) that receive the slideable block 712. The slideable block 712 is slidably mounted in the tracks 710. The tracks 710 may be made of, or coated with, a low friction material, such as Teflon or the like.

In addition to being connected to the first pulley 720, the slideable block 712 is connected at one end to a spring 734 that is further wound around at least one of the first and second spring spools 730, 732. The spring 734 (in a normal or relaxed state) exerts a near continuous retraction force to urge the slideable block 712, along with the first pulley 720, away from the second pulley 740. The retraction force urges the slideable block 712 away from the second pulley 740 to a storage or retracted position.

The cable retractor 700 may include a dampening system (not shown) for preventing the cable 224 from whipping during retraction.

When a user desires to draw out a length of the cable 224, the user typically pulls on the second (free) end 786 of the cable 224. By the user exerting a force greater than the retraction force exerted by the spring 734, the pulling on the second (free) end 786 of the cable 224 urges the first pulley 720, along with the slideable block 712, longitudinally along the tracks 710 toward the second pulley 740.

As the free end 786 of the cable 224 is withdrawn, the first pulley 720 together with the slideable block 712 moves from a position shown in FIG. 7B toward a position shown in FIG. 7C. At the same time, the spring 734 is unwound from the first and second spring spools 730, 732 and exerts a force counter to the force exerted by the user. That is, a user pulling on the free end 786 of the stored cable 224 exerts a force on the first pulley 720 and draws the slideable block 712 and the first pulley 720 along the track 710 away from first and second spring spools 730, 732 and toward the fixed second pulley 740. This motion of the slideable block 712 and longitudinally first pulley 720 is resisted by continued elongation of the spring 734 from the spring spools 730, 732 during withdrawal of on the free end 786 of the stored cable 224

Should the user then release the free end 786 of the cable, the spring 734 ordinarily would draw the free end 786 of the cable 224, together with any portion of the intermediate storage section 782 of the cable 224 that was withdrawn from the retractor 150, back inside the retractor frame 700. Therefore, to prevent the withdrawn cable from being pulled back in and allowing its use, at least one hold/release mechanism 400, 500, or 600, shown in FIGS. 4A-4B, 5A-5D or 6A-6D, respectively, is provided. When the free end 786 of the cable 224 is partially or fully withdrawn from the retractor body 700, the hold/release mechanism 400, 500, or 600 holds the cable in place. To retract the withdrawn part of the cable 224 back inside the retractor body 700, the user depresses the push button 240 or 640 or slides the slider 540 to release the cable 224 in the manner described above. The user may hold the button 240, 640 or the slider 540 in place until all of the withdrawn part of the cable 224 is returned inside the retractor frame 700 or until a desired portion of the cable 224 remains outside of the rotatable docking station 100.

FIG. 8 shows the rotatable docking station 100 in position to be inserted into an opening in a mounting structure 800. The mounting structure 800 may be a portion of the table top, desk top, or other structure. The opening may be a circular opening 802 into which the cylindrical-shaped insertable part 210 of the swivel mount assembly 110 may be inserted.

As described above, the rotatable docking station 100 includes the swivel mount assembly 110 and the retractors 150. Additionally, connectors 790 are provided at the respective free ends of the cables 224, and extend outward from the side wall apertures of the swivel mount assembly 110. The connectors 790 are in positions where any one of them may be pulled away from the swivel mount assembly 110, at the same time withdrawing a portion of the attached cable 224 from the corresponding cable retractor 150.

FIGS. 9A-9D show the rotatable docking station 100 after insertion into the opening 802. FIG. 9A shows a front view, FIG. 9B shows a side view, and FIGS. 9C-9D show perspective views of the mounted rotatable docking station 100.

The cable retractors 150, as well as the assembly body of the swivel mount assembly 110, are hidden below the mounting structure 800. Only the portion of the swivel mount assembly 110 that is from the lip part 204 to the platform part 230 remains above a first surface 804 of the mounting structure 800, with the lip part resting directly on the first surface 804.

The insertable part 210 of the swivel mount assembly 110 is secured to the mounting structure 800 using the threaded securing body 250, shown in FIG. 8. Specifically, the securing body 250 is turned about the threads 212 of the insertable part 210 until the securing body 250 contacts the second surface 806 of the mounting body 800, causing the lip part 204 to press against the first surface 804 of the mounting structure 800 and securing the insertable part 210 of the swivel mount assembly 110 and the cable retractor in place. The rotatable body 202 of the swivel mount assembly 110, however, remains free to be rotated at least within the predetermined range of angles.

FIGS. 10A-10B show the mounting of an electronic device 820 that is to be supported by the rotatable docking station 100. According to an embodiment, the electronic device 820 is securable to the extensions 234 of the swivel mount assembly 110. Additionally, power and data cables (not shown) extending from the bottom of the electronic device 820 are fed through apertures (not shown) in the platform part 230 of the swivel mount assembly 110 to be hidden from view.

INDUSTRIAL APPLICABILITY

To solve the aforementioned problems, the present embodiments provide a rotatable docking station that includes a swivel mount assembly and one or more cable retractors.

Alternate Embodiments

Alternate embodiments may be devised without departing from the spirit or the scope of the embodiments.

What is claimed is:

1. A swivel mount assembly for rotational mounting of an electronic device to a mounting structure, the swivel mount assembly comprising:
   (a) a rotatable body configured to be inserted, in part, into an opening in the mounting structure and to be rotatable about an axis extending through the opening in the mounting structure, the rotatable body comprising:
      (1) a plate part disposed above the mounting structure, the plate part having at least one opening formed therein that opens into the opening in the mounting structure,
      (2) at least one sidewall joined at one end thereof to the plate part, and having at least one side aperture formed therein,
      (3) at least one roller disposed in the at least one opening in the plate part and configured to direct a cable extending through the opening in the mounting structure to further pass through the at least one side aperture of the at least one sidewall, and
      (4) a hold/release mechanism disposed above the plate part and configured to hold the cable and prevent its movement in response to the hold/release mechanism being in a first setting and to release the cable and permit its movement in response to the hold/release mechanism being in a second setting.

2. The swivel mount assembly of claim 1, wherein the hold/release mechanism comprises
   (a) a flat piece located between the roller and the side aperture and adjacent to one side of the cable,
   (b) a movable piece located between the roller and the side aperture and adjacent to another side of the cable,
   (c) a spring coupled at one end to the plate part and at another end to the movable piece and configured to press the movable piece against the cable to hold the cable against the flat piece, thereby preventing movement of the cable,
   (d) a push button configured to move in and out through a further aperture in the at least one sidewall, and
   (e) a lever arm movable about a pivot and coupled at one end to the push button and coupled at another end to the movable piece such that in response to the push button being pushed toward the further aperture, the lever arm turns about the pivot and moves the movable piece away from the cable, thereby allowing the cable to move freely, and in response to the push button being released, the lever arm turns about the pivot to allow the spring to push the movable piece back against the cable, thereby preventing further movement of the cable.

3. The swivel mount assembly of claim 1, wherein
   (a) the at least one side aperture of the at least one sidewall is of sufficient size to permit the further cable to pass through the side aperture but is smaller than a connector disposed outside the swivel mount assembly at an end of the further cable to prevent the connector from passing through the side aperture.

4. The swivel mount assembly of claim 1, wherein the hold/release mechanism comprises
   (a) a flat piece located between the roller and the side aperture and adjacent to one side of the cable,
   (b) a cam located between the roller and the side aperture and adjacent to another side of the cable, the cam being rotatable about a pivot, and
   (c) a spring coupled to the cam and configured to drive the cam to turn about the pivot such that a nose part of the cam presses on the cable and holds it against the flat piece, thereby preventing movement of the cable.

5. The swivel mount assembly of claim 4, wherein the hold/release mechanism further comprises
(a) a sliding piece configured to slide in a further opening in the at least one sidewall, and
(b) a bar coupled at one end to the sliding piece and coupled at another end to the cam such that in response to the sliding piece being moved in the further opening along a first direction, the bar pulls on the cam to turn the nose part away from the cable, thereby allowing the cable to move freely, and in response to the sliding piece moving in the opening along a second direction opposite to the first direction, the nose part of the cam again presses on the cable and holds it against the flat piece, thereby preventing further movement of the cable.

6. The swivel mount assembly of claim 4, wherein the hold/release mechanism further comprises
(a) a push button configured to move in and out through a further aperture in the at least one sidewall, and
(b) a bar coupled at one end to the push button and coupled at another end to the cam such that in response to the push button being pushed toward the further aperture, the bar pulls on the cam to turn the nose part away from the cable, thereby allowing the cable to move freely, and in response to the push button being released, the nose part of the cam again presses on the cable and holds it against the flat piece, thereby preventing further movement of the cable.

7. The swivel mount assembly of claim 1, wherein
(a) a plurality of sidewalls are each joined at one end thereof to the plate part, at least one of the sidewalls having the at least one side aperture formed therein.

8. The swivel mount assembly of claim 7, wherein the rotatable body further comprises
(a) a platform part disposed at an opposing end of each of the plurality of sidewalls and being configured to support the electronic device.

9. The swivel mount assembly of claim 8, wherein
(a) the hold/release mechanism is disposed between the plate part and the platform part.

10. The swivel mount assembly of claim 8, wherein
(a) the plate part has at least one hole formed therein,
(b) the platform part has at least one hole formed therein, the at least one hole in the plate part and the at least one hole in the platform part being disposed at respective locations that permit a further cable extending from the electronic device to pass through each.

11. The swivel mount assembly of claim 8, wherein
(a) at least one extension extends from the platform part that permits the electronic device to be secured thereto.

12. A swivel mount assembly for rotational mounting of an electronic device to a mounting structure, the swivel mount assembly comprising:
(a) an assembly body configured to be securable about an opening in the mounting structure; and
(b) a rotatable body configured to be inserted, in part, into an opening in the assembly body and to be rotatable about an axis extending through the opening in the mounting structure, the rotatable body comprising:
(1) a plate part disposed above the mounting structure, the plate part having at least one opening formed therein that opens into the opening in the mounting structure,
(2) a plurality of sidewalls each joined at one end thereof to the plate part, at least one of the sidewalls having at least one side aperture formed therein,
(3) at least one roller disposed in the at least one opening in the plate part,
(4) a platform part disposed at an opposing end of each of the plurality of sidewalls and being configured to support the electronic device, and
(5) a hold/release mechanism disposed between the plate part and the platform part, the hold/release mechanism comprising
(A) a flat piece located between the roller and the side aperture and adjacent to one side of a cable,
(B) a cam located between the roller and the side aperture and adjacent to another side of the cable, the cam being rotatable about a pivot,
(C) a spring coupled to the cam and configured to drive the cam to turn about the pivot such that a nose part of the cam presses on the cable and holds it against the flat piece, thereby preventing movement of the cable,
(D) a sliding piece configured to slide in a further opening in one of the plurality of sidewalls, and
(E) a bar coupled at one end to the sliding piece and coupled at another end to the cam such that in response to the sliding piece being moved in the further opening along a first direction, the bar pulls on the cam to turn the nose part away from the cable, thereby allowing the cable to move freely, and in response to the sliding piece moving in the opening along a second direction opposite to the first direction, the nose part of the cam again presses on the cable and holds it against the flat piece, thereby preventing further movement of the cable.

13. The swivel mount assembly of claim 12, wherein
(a) at least one extension extends from the platform part of the swivel mount assembly and permits the electronic device to be secured thereto.

14. The swivel mount assembly of claim 12, wherein
(a) the plate part has at least one hole formed therein,
(b) the platform part has at least one hole formed therein, the at least one hole in the plate part and the at least one hole in the platform part being disposed at respective locations that permit a further cable extending from the electronic device to pass through each.

15. A rotatable docking station, comprising:
(a) a swivel mount assembly for rotational mounting of an electronic device to a mounting structure, the swivel mount assembly comprising:
(1) an assembly body configured to be securable about an opening in the mounting structure; and
(2) a rotatable body configured to be inserted, in part, into an opening in the assembly body and to be rotatable about an axis extending through the opening in the mounting structure, the rotatable body comprising:
(A) a plate part disposed above the mounting structure, the plate part having at least one opening formed therein that opens into the opening in the mounting structure,
(B) a plurality of sidewalls each joined at one end thereof to the plate part, at least one of the sidewalls having at least one side aperture formed therein,
(C) at least one roller disposed in the at least one opening in the plate part, (D) a platform part disposed at an opposing end of each of the plurality of sidewalls and being configured to support the electronic device, and (E) ahold/release mechanism disposed between the plate part and the platform part, the hold/release mechanism comprising (i) a flat piece located between the roller and the side aperture and adjacent to one side of a cable (ii) a cam located between the roller and the side aperture and adjacent to another side of the cable, the cam being rotatable about a pivot, (iii) a spring coupled to the cam and configured to drive the cam to turn about the pivot such that a nose part of the cam presses on the cable and holds it against the flat piece, thereby preventing movement of the cable, (iv) a sliding piece configured to slide in a further opening in one of the plurality of sidewalls, and (v) a bar coupled at one end to the sliding piece and coupled at another end to the cam such that in response to the sliding piece being moved in the further opening along a first direction, the bar pulls on the cam to turn the nose part away from the cable, thereby allowing the cable to move freely, and in response to the sliding piece moving in the opening along a second direction opposite to the first direction, the nose part of the cam again presses on the cable and holds it against the flat piece, thereby preventing further movement of the cable; and (b) at least one cable retractor coupled to the rotatable body of the swivel mount assembly and configured to retractably store a section of the cable within the at least one retractor, an end of the cable extending through an opening in the at least one cable retractor, (c) wherein:

(1) the at least one roller disposed in the at least one opening in the plate part is configured to direct the end of the cable to further pass through the at least one side aperture of the at least one of the sidewalls, and (2) in response to the end of the cable being pulled away from the at least one side aperture of the rotatable body, a portion of the cable is withdrawn from the swivel mount assembly.

16. A swivel mount assembly, comprising:

(a) an assembly body configured to be securable to about an opening in the mounting structure; and (b) a rotatable body configured to be inserted, in part, into an opening in the assembly body and to be rotatable about an axis extending through the opening in the mounting structure, the rotatable body comprising:

(1) a plate part disposed above the mounting structure, the plate part having at least one opening formed therein that opens into the opening in the mounting structure, (2) a plurality of sidewalls each joined at one end thereof to the plate part, at least one of the sidewalls having at least one side aperture formed therein, (3) at least one roller disposed in the at least one opening in the plate part, (4) a platform part disposed at an opposing end of each of the plurality of sidewalls and being configured to support the electronic device, and (5) a hold/release mechanism disposed between the plate part and the platform part, the hold/release mechanism comprising (A) a flat piece located between the roller and the side aperture and adjacent to one side of the cable, (B) a movable piece located between the roller and the side aperture and adjacent to another side of the cable, (C) a spring coupled at one end to the plate part and at another end to the movable piece and configured to press the movable piece against the cable to hold the cable against the flat piece, thereby preventing movement of the cable, (D) a push button configured to move in and out through a further opening in one of the plurality of sidewalls, and (E) a lever arm movable about a pivot and coupled at one end to the push button and coupled at another end to the movable piece such that in response to the push button being pushed toward the opening, the lever arm turns about the pivot and moves the movable piece away from the cable, thereby allowing the cable to move freely, and in response to the push button being released, the lever arm turns about the pivot to allow the spring to push the movable piece back against the cable, thereby preventing further movement of the cable.

17. The swivel mount assembly of claim 16, wherein (a) at least one extension extends from the platform part of the swivel mount assembly and permits the electronic device to be secured thereto.

18. The swivel mount assembly of claim 17, wherein (a) the plate part has at least one hole formed therein, (b) the platform part has at least one hole formed therein, the at least one hole in the plate part and the at least one hole in the platform part being disposed at respective locations that permit a further cable extending from the electronic device to pass through each.

19. A rotatable docking station, comprising:

(a) a swivel mount assembly, the a swivel mount assembly included:

(1) an assembly body configured to be securable to about an opening in the mounting structure; and (2) a rotatable body configured to be inserted, in part, into an opening in the assembly body and to be rotatable about an axis extending through the opening in the mounting structure, the rotatable body comprising:

(A) a plate part disposed above the mounting structure, the plate part having at least one opening formed therein that opens into the opening in the mounting structure, (B) a plurality of sidewalls each joined at one end thereof to the plate part, at least one of the sidewalls having at least one side aperture formed therein, (C) at least one roller disposed in the at least one opening in the plate part, (D) a platform part disposed at an opposing end of each of the plurality of sidewalls and being configured to support the electronic device, and (E) a hold/release mechanism disposed between the plate part and the platform part, the hold/release mechanism comprising (i) a flat piece located between the roller and the side aperture and adjacent to one side of the cable (ii) a movable piece located between the roller and the side aperture and adjacent to another side of the cable,
(iii) a spring coupled at one end to the plate part and at another end to the movable piece and configured to press the movable piece against the cable to hold the cable against the flat piece, thereby preventing movement of the cable,
(iv) a push button configured to move in and out through a further opening in one of the plurality of sidewalls, and
(v) a lever arm movable about a pivot and coupled at one end to the push button and coupled at another end to the movable piece such that in response to the push button being pushed toward the opening, the lever arm turns about the pivot and moves the movable piece away from the cable, thereby allowing the cable to move freely, and in response to the push button being released, the lever arm turns about the pivot to allow the spring to push the movable piece back against the cable, thereby preventing further movement of the cable; and (b) at least one cable retractor coupled to the rotatable body of the swivel mount assembly and configured to retractably store a section of the cable within the at least one retractor, an end of the cable extending through an opening in the at least one cable retractor, (c) wherein
  (1) the at least one roller disposed in the at least one opening in the plate part is configured to direct the end of the cable to further pass through the at least one side aperture of the at least one of the sidewalls, and
  (2) in response to the end of the cable being pulled away from the at least one side aperture of the rotatable body, a portion of the cable is withdrawn from the swivel mount assembly.

\* \* \* \* \*